US010142957B2

(12) United States Patent
Sheng

(10) Patent No.: US 10,142,957 B2
(45) Date of Patent: Nov. 27, 2018

(54) RESOURCE SELECTION FOR VEHICLE (V2X) COMMUNICATIONS

(71) Applicant: Sharp Kabushiki Kaisha, Sakai, Osaka (JP)

(72) Inventor: Jia Sheng, Vancouver, WA (US)

(73) Assignee: Sharp Kabushiki Kaisha, Sakai, Osaka (JP)

( * ) Notice: Subject to any disclaimer, the term of this patent is extended or adjusted under 35 U.S.C. 154(b) by 0 days.

(21) Appl. No.: 15/477,299

(22) Filed: Apr. 3, 2017

(65) Prior Publication Data

US 2017/0295579 A1      Oct. 12, 2017

Related U.S. Application Data

(60) Provisional application No. 62/319,065, filed on Apr. 6, 2016.

(51) Int. Cl.
| | |
|---|---|
| *H04W 24/00* | (2009.01) |
| *H04W 64/00* | (2009.01) |
| *H04W 72/02* | (2009.01) |
| *H04W 88/02* | (2009.01) |
| *H04W 72/04* | (2009.01) |
| *H04W 76/14* | (2018.01) |

(52) U.S. Cl.
CPC ........... *H04W 64/00* (2013.01); *H04W 72/02* (2013.01); *H04W 64/006* (2013.01); *H04W 72/048* (2013.01); *H04W 76/14* (2018.02); *H04W 88/02* (2013.01)

(58) Field of Classification Search
CPC ..... H04W 72/06; H04W 64/00; H04W 88/02; H04W 88/08

USPC ................ 455/456.1, 404.2, 450, 452.2, 509
See application file for complete search history.

(56) References Cited

U.S. PATENT DOCUMENTS

| | | | | |
|---|---|---|---|---|
| 9,232,550 | B2 * | 1/2016 | Gao | H04W 72/085 |
| 9,326,122 | B2 * | 4/2016 | Xiong | H04W 8/005 |
| 9,496,971 | B2 * | 11/2016 | Edge | H04W 8/005 |
| 9,559,761 | B2 * | 1/2017 | Luft | H04B 7/0456 |
| 9,788,186 | B2 * | 10/2017 | Chatterjee | H04W 48/16 |
| 2014/0328329 | A1 * | 11/2014 | Novlan | H04W 72/042 370/336 |
| 2015/0215903 | A1 * | 7/2015 | Zhao | H04W 72/04 370/329 |
| 2015/0264588 | A1 * | 9/2015 | Li | H04W 56/0015 370/350 |

(Continued)

FOREIGN PATENT DOCUMENTS

| | | |
|---|---|---|
| WO | WO 2015/142074 A1 | 9/2015 |
| WO | WO 2015/178851 A1 | 11/2015 |

OTHER PUBLICATIONS

International Search Report and Written Opinion dated Jun. 27, 2017 in PCT Application No. PCT/US17/25692.

(Continued)

*Primary Examiner* — Marceau Milord
(74) *Attorney, Agent, or Firm* — Nixon & Vanderhye P.C.

(57) ABSTRACT

Method and apparatus comprise selecting radio resources for vehicle (V2X) communication for use by a wireless terminal, and particular making such selection using selection/allocation criteria such as geographical area, direction of vehicle travel and/or density of wireless communications in an area pertinent to a wireless terminal.

8 Claims, 20 Drawing Sheets

SELECT RESOURCES ACCORDING TO FIRST OF PLURAL FACTORS — 16-1

SELECT RESOURCES ACCORDING TO SECOND OF PLURAL FACTORS — 16-2

SELECT RESOURCES ACCORDING TO THIRD OF PLURAL FACTORS — 16-3

FOR V2X COMMUNICATION USE RESOURCES ACCORDING TO COMBINATION OF PLURAL FACTORS — 16-4

(56) References Cited

U.S. PATENT DOCUMENTS

| | | | |
|---|---|---|---|
| 2016/0021625 A1* | 1/2016 | Li | H04W 72/1289 370/336 |
| 2016/0044619 A1* | 2/2016 | Ryu | H04W 76/14 370/350 |
| 2016/0095092 A1* | 3/2016 | Khoryaev | H04W 8/005 370/329 |
| 2016/0157254 A1* | 6/2016 | Novlan | H04W 76/14 370/329 |
| 2016/0302215 A1* | 10/2016 | Sorrentino | H04W 76/14 |
| 2017/0006652 A1* | 1/2017 | Lee | H04W 72/08 |
| 2017/0188391 A1* | 6/2017 | Rajagopal | H04W 74/0816 |
| 2017/0289733 A1* | 10/2017 | Rajagopal | H04W 4/005 |

OTHER PUBLICATIONS

3GPP TSG RAN Meeting #68, RP-151109, LG Electronics, CATT, Bodafone, Huawei, "New SI Proposal: Feasibility Study on LTE-Based V2X Services", Malmo, Sweden, Jun. 15-18, 2015.

3GPP TSG RAN Meeting #70, RP-152293, LG Electronics, Huawei, HiSilicon, CATT, CATR, "New WI Proposal: Support for V2V Services Based on LTE Sidelink", Sitges, Spain, Dec. 7-10, 2015.

3GPP TR 22.885 and System V1.0.0, Technical Report, $3^{rd}$ Generation Partnership Project; Technical Specification Group Services and System Aspects; Study on LTE Support for V2X Services (Release 14) (Sep. 2015).

3GPP TR 22.885 and System V14.0.0, Technical Report, $3^{rd}$ Generation Partnership Project; Technical Specification Group Services and System Aspects; Study on LTE Support for V2X Services (Release 14) (Dec. 2015).

3GPP TSG RAN WG1 #84, R1-160575, Samsung, "Resource Pool for V2V", St. Julian's, Malta, Feb. 15-19, 2016.

3GPP TSG RAN WG1 Meeting #84, R1-160366, CATT, "Considerations on V2V traffic priority and relative resource allocation", St. Julian's, Malta, Feb. 15-19, 2016.

3GPP TSG RAN WG1 Meeting #84, R1-160636, LG Electronics, "Discussion on resource pool structure for PC5-based V2V", St. Julian's, Malta, Feb. 15-19, 2016.

3GPP TSG RAN WG1 Meeting #84, R1-160678, Sony, "Location based resource services selection on LTE sidelink for V2V services", St. Julian's, Malta, Feb. 15-19, 2016.

3GPP TSG RAN WG1 Meeting #84, R1-160679, Sony, "Resource pool configurations on LTE sidelink for V2V services", St. Julian's, Malta, Feb. 15-19, 2016.

3GPP TSG RAN WG1 Meeting #84, R1-160682, ZTE, "Resource pool allocation enhancement for V2V", St. Julian's, Malta, Feb. 15-19, 2016.

3GPP TSG RAN WG1 Meeting #84, R1-160689, ZTE, Discussion on resource allocation and procedure for V2V, St. Julian's, Malta, Feb. 15-19, 2016.

3GPP TSG RAN WG1 Meeting #84, R1-160895, Qualcomm Incorporated, "Resource Pool Design for V2V", St. Julian's, Malta, Feb. 15-19, 2016.

3GPP TSG RAN WG1 Meeting #84, R1-160909, Nokia Networks, Alcatel Lucent Alcatel Lucent Shanghai Bell, "On resource control/selection mechanisms for V2V operation", St. Julian's, Malta, Feb. 15-19, 2016.

3GPP TSG RAN WG1 Meeting #84, R1-R1-161031, General Motors, "Geo Based Resource Scheduling for V2V Communication", St. Julian's, Malta, Feb. 15-19, 2016.

3GPP TSG RAN WG1 Meeting #84, R1-160360, CATT, "Synchronization enhancements in PC5-based V2V", St. Julian's, Malta, Feb. 15-19, 2016.

3GPP TSG RAN WG1 Meeting #84, R1-160307, Huawei, HiSilicon, "UE autonomous resource selection", St. Julian's, Malta, Feb. 15-19, 2016.

3GPP TSG RAN WG1 Meeting #84, R1-160431, Intel Corporation, "Support of geo-based transmission schemes for V2V communication", St. Julian's, Malta, Feb. 15-19, 2016.

3GPP TSG RAN WG1 Meeting #84, R1-161075, Ericsson, "Discussion on V2X PC5 Scheduling, Resource Pools and Resource Patterns" Malta, Feb. 15-19, 2016.

3GPP TS 36.331 V13.0.0, Technical Specification, $3^{rd}$ Generation Partnership Project; Technical Specification Group Radio Access Network; Evolved Universal Terrestrial Radio Access (E-UTRA); Radio Resource Control (RRC); Protocol Specification (Release 13) (Dec. 2015).

3GPP TS 36.304 V13.5.0, Technical Specification; $3^{rd}$ Generation Partnership Project; Technical Specification Group Radio Access Network; Evolved Universal Terrestrial Radio Access (E-UTRA); User Equipment (UE) procedures in idle mode (Release 13) (Mar. 2017).

3GPP TS 36.211 V13.5.0, Technical Specification; $3^{rd}$ Generation Partnership Project; Technical Specification Group Radio Access Network; Evolved Universal Terrestrial Radio Access (E-UTRA); Physical channels and modulation (Release 13) (Mar. 2017).

3GPP TS 36.133 V13.7.0, Technical Specification; $3^{rd}$ Generation Partnership Project; Technical Specification Group Radio Access Network; Evolved Universal Terrestrial Radio Access (E-UTRA); Requirements for support of radio resource management (Release 13) (Mar. 2017).

3GPP TS 36.331 V13.5.0, Technical Specification; $3^{rd}$ Generation Partnership Project; Technical Specification Group Radio Access Network; Evolved Universal Terrestrial Radio Access (E-UTRA); Radio Resource Control (RRC); Protocol specification (Release 13) (Mar. 2017).

* cited by examiner

LOW LOAD AREA

MODERATE LOAD AREA

HIGH LOAD AREA

VERY HIGH LOAD AREA

RESOURCE SELECTION FOR VEHICLE (V2X) COMMUNICATIONS

This application claims the priority and benefit of U.S. Provisional Patent Application 62/319,065, filed Apr. 6, 2016, entitled "RESOURCE SELECTION FOR VEHICLE (V2X) COMMUNICATIONS", which is incorporated herein by reference in its entirety.

TECHNICAL FIELD

The technology relates to wireless communications, and particularly to selection of resources for vehicle (V2X) communications.

BACKGROUND

When two user equipment terminals (e.g., mobile communication devices) of a cellular network or other telecommunication system communicate with each other, their data path typically goes through the operator network. The data path through the network may include base stations and/or gateways. If the devices are in close proximity with each other, their data path may be routed locally through a local base station. In general, communications between a network node such as a base station and a wireless terminal is known as "WAN" or "Cellular communication".

It is also possible for two user equipment terminals in close proximity to each other to establish a direct link without the need to go through a base station. Telecommunications systems may use or enable device-to-device ("D2D") communication, in which two or more user equipment terminals directly communicate with one another. In D2D communication, voice and data traffic (referred to herein as "communication signals" or "communications") from one user equipment terminal to one or more other user equipment terminals may not be communicated through a base station or other network control device of a telecommunication system. "Device-to-device ("D2D") communication may also be known as "sidelink direct" communication (e.g., sidelink communication), or even as "sidelink", "SL", or "SLD" communication.

D2D or sidelink direct communication can be used in networks implemented according to any suitable telecommunications standard. A non-limiting example of such as standard is the 3rd Generation Partnership Project ("3GPP") Long Term Evolution ("LTE"). The 3GPP standard is a collaboration agreement that aims to define globally applicable technical specifications and technical reports for third and fourth generation wireless communication systems. The 3GPP may define specifications for next generation mobile networks, systems, and devices.

Currently 3GPP is specifying a new feature for Rel-14 that covers use cases and potential requirements for LTE support for vehicular communications services (represented by the term, Vehicle-to-Everything (V2X) Services). The feature is documented in the TR 22.885 on LTE Study on LTE Support for V2X Services. Contemplated V2X services may include one or more of the following:

V2V: covering LTE-based communication between vehicles.

V2P: covering LTE-based communication between a vehicle and a device carried by an individual (e.g. handheld terminal carried by a pedestrian, cyclist, driver or passenger).

V2I: covering LTE-based communication between a vehicle and a roadside unit. A roadside unit (RSU) is a transportation infrastructure entity (e.g. an entity transmitting speed notifications).

Thus far 3GPP deliberations concerning resource pool design have essentially assumed that a similar resource pool construction will be used for V2X as has been used for LTE sidelink, e.g., have assumed that Rel-12 and Rel-13 D2D resource pool design would be the baseline of V2X design. However, there are numerous and challenging differences between V2X and DSL (D2D), as discussed below.

Sidelink direct (SLD) resource allocation is primarily either through SIB18 broadcast signaling, or dedicated signaling, or pre-configuration. Regardless of which of these three manners of resource allocation are employed, the SLD resource pool design only considers priority for resource differentiation. For example, SLD resource allocation does not include any collision avoidance mechanism when such as when wireless terminals attempt to use the same resources at the same time as well.

By contrast, in V2X communications the resource usage situation becomes much more complicated, for many reasons. Once such reason is that there will be many more wireless terminals in areas such as a city center. Another reason is that traffic situations may vary time by time even in the same area, or dramatically changes due to some accidental events. When such situations occur, whether the original allocated resources remain sufficient, or how to make the best use of the current resources with least collision, will be problematic.

3GPP discussions have been extended to such problems, e.g., "Sets of resources among which a UE selects can be restricted based on the geo information of the UE. Send LS to RAN2 asking them to enable mapping a set of locations to a set of resources". Details of 3GPP discussions are referred in background part. Note that it was agreed that besides "Geo-information (e.g. vehicle location)" which will be sent from UE to eNB for resource allocation, other information can also be reported to eNB.

What is needed are methods, apparatus, and/or techniques for controlling resource assignment and utilization in vehicle (V2X) communications.

SUMMARY

In one of its example aspects the technology disclosed herein concerns a wireless terminal comprising memory circuitry, detection circuitry, and selection controlling circuitry. The memory circuitry is configured to store first information specifying multiple geographical regions and second information multiple resource pools. The detecting circuitry is configured to detect a current geographical region. The selection controlling circuitry is configured to select a resource pool from the multiple resource pools based on the geographical region. In an example embodiment and mode, the first information and the second information are pre-configured in the memory circuitry. In another example embodiment and mode, the wireless terminal further comprises controlling circuitry configured to receive a system information block (SIB) which carries the first information and the second information. A corresponding method of operating the wireless terminal is also understood from the description herein.

In another of its aspects the technology disclosed herein concerns a wireless terminal configured for use in vehicle (V2X) communications and method in such wireless terminal. The wireless terminal comprises a detector and processor circuitry. The detector is configured to determine a direction/orientation of travel of the wireless terminal. The processor circuitry is configured to use the direction of travel to determine a radio resource for use by the wireless terminal for a vehicle (V2X) communication; and In another of its aspects the technology disclosed herein concerns a node of a cellular radio access network and method in such node. In a basic embodiment and mode node comprises processor circuitry and transmitter circuitry. The processor circuitry is configured to maintain a direction-dependent resource list, the direction-dependent resource list comprising plural members corresponding to plural pre-defined directions of potential travel of a wireless terminal in coverage of the cellular radio access network, each of the plural members respectively comprising an identifier/pointer/mapper/definition of a subset of a set of radio resources for use in vehicle (V2X) communication, each of plural subsets being associated with a corresponding one of plural pre-defined directions. The transmitter circuitry is configured to transmit the direction-dependent resource list over a radio interface.

In another of its aspects the technology disclosed herein concerns a wireless terminal configured for use in vehicle (V2X) communications and method of operating such wireless terminal. The wireless terminal comprises a detector; processor circuitry; and transceiver circuitry. The detector is configured to determine a density indicator which expresses density of wireless communication in an area pertinent to the wireless terminal. The processor circuitry is configured to use the density indicator to determine a radio resource for use by the wireless terminal for a vehicle (V2X) communication. The transceiver circuitry is configured to use the radio resource for the vehicle (V2X) communication.

In another of its aspects the technology disclosed herein concerns a node of a cellular radio access network and method of operating such node. The node comprises processor circuitry and transmitter circuitry. The processor circuitry is configured to maintain a density-dependent resource list, the density-dependent resource list comprising plural members corresponding to plural pre-defined density values of wireless communication in an area pertinent to a wireless terminal, each of the plural members respectively comprising an identifier of a subset of a set of radio resources for use in vehicle (V2X) communication, each of plural subsets being associated with a corresponding one of plural pre-defined density values. The transmitter circuitry is configured to transmit the density-dependent resource list over a radio interface.

In another of its aspects the technology disclosed herein concerns a wireless terminal and a method in wireless terminal. In a basic mode the method comprises: selecting radio resources according to a first of plural criteria; selecting radio resources according to a second of plural criteria; and, using, for V2X communication, a radio resource selected according to a combination of the plural criteria.

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

FIG. 10B showing the wireless terminal in a moderate density area; FIG. 10C showing the wireless terminal in a high density area; FIG. 10D showing the wireless terminal in a very high density area.

FIG. 11B showing the wireless terminal in a moderate density area; FIG. 11C showing the wireless terminal in a high density area; FIG. 11D showing the wireless terminal in a very high density area.

DETAILED DESCRIPTION

Figure 1:
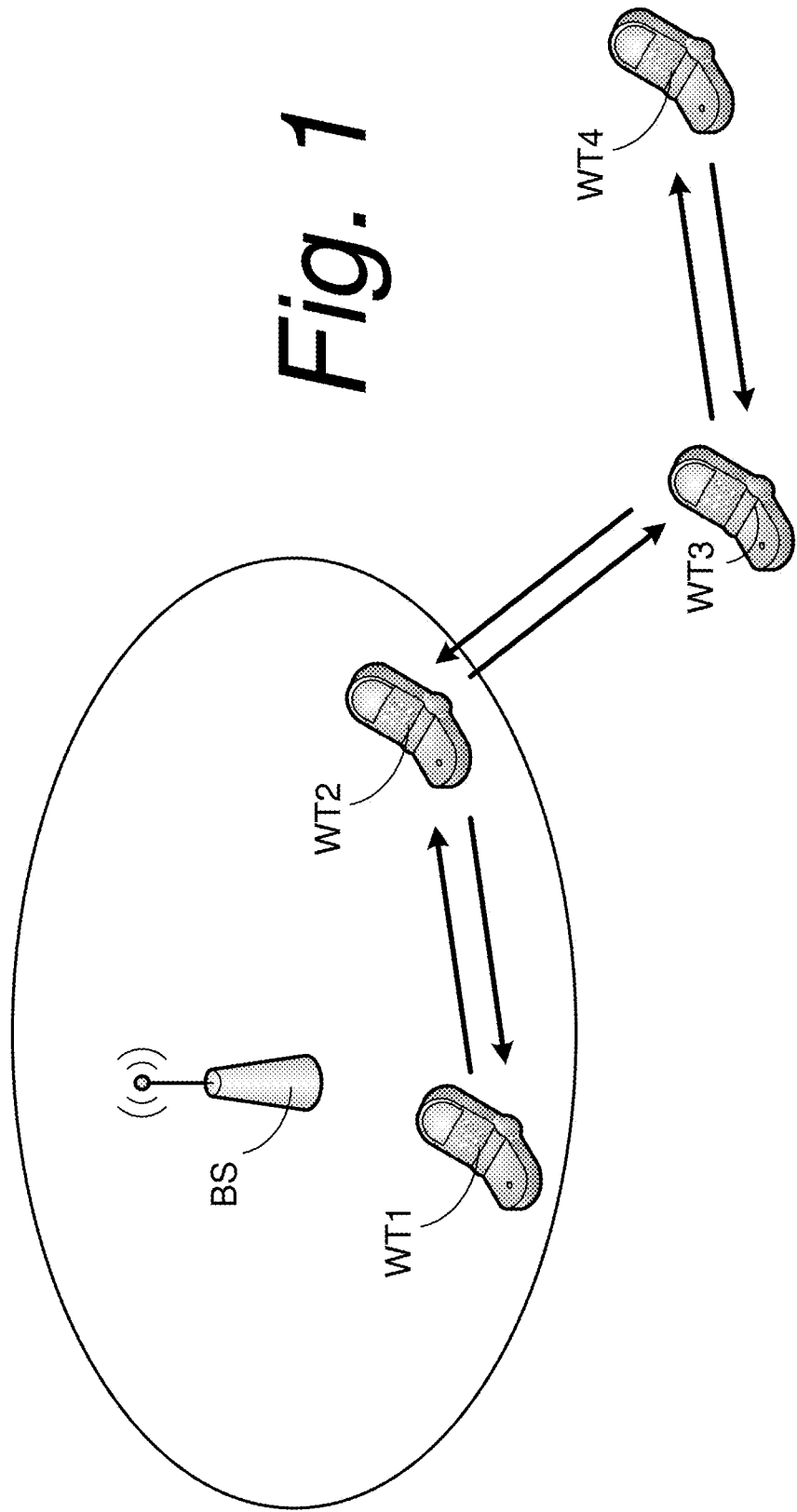
FIG. 1 is a diagrammatic view showing generally three scenarios which may occur in vehicle (V2X) communication, i.e., an in coverage vehicle (V2X) communication scenario; a partial coverage vehicle (V2X) communication scenario; and an out-of-coverage vehicle (V2X) communication scenario.

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

As used herein, the term "device-to-device ("D2D") communication" may refer to a mode of communication between or among wireless terminals that operate on a cellular network or other telecommunications system in which the communication data traffic from one wireless terminal to another wireless terminal does not pass through a centralized base station or other device in the cellular network or other telecommunications system. The "device-to-device (D2D) communication" encompasses one or both of D2D signaling (e.g., D2D control information) and D2D data. "Device-to-device ("D2D") communication may also be known as "sidelink direct" communication (e.g., sidelink communication). The term "sidelink direct" may also be shortened to "sidelink", abbreviated as "SL", and as such "sidelink" may be used herein to refer to sidelink direct. Yet further, the term "ProSe" (Proximity Services) direct communication may be used in lieu of sidelink direct communication or device-to-device (D2D) communication. Therefore, it is to be understood that herein the terms "sidelink direct", 'sidelink" (SL), "ProSe" and "device-to-device (D2D)" may be interchangeable and synonymous.

Thus, as mentioned above, device-to-device (D2D) or sidelink direct communication differs from "WAN" or "Cellular communication" which is or involves communication between the base station and the wireless terminal. In device-to-device (D2D) communication, communication data is sent using communication signals and can include voice communications or data communications intended for consumption by a user of a wireless terminal. Communication signals may be transmitted directly from a first wireless terminal to a second wireless terminal via D2D communication. In various aspects, all, some or none of the control signaling related to the D2D packet transmission may be managed or generated by the underlying core network or base station. In additional or alternative aspects, a receiver user equipment terminal may relay communication data traffic between a transmitter user equipment terminal and one or more additional receiver user equipment terminals.

As used herein, the term "core network" can refer to a device, group of devices, or sub-system in a telecommunication network that provides services to users of the telecommunications network. Examples of services provided by a core network include aggregation, authentication, call switching, service invocation, gateways to other networks, etc.

As used herein, the term "wireless terminal" can refer to any electronic device used to communicate voice and/or data via a telecommunications system, such as (but not limited to) a cellular network. Other terminology used to refer to wireless terminals and non-limiting examples of such devices can include user equipment terminal, UE, mobile station, mobile device, access terminal, subscriber station, mobile terminal, remote station, user terminal, terminal, subscriber unit, cellular phones, smart phones, personal digital assistants ("PDAs"), laptop computers, netbooks, e-readers, wireless modems, etc.

As used herein, the term "access node", "node", or "base station" can refer to any device or group of devices that facilitates wireless communication or otherwise provides an interface between a wireless terminal and a telecommunications system. A non-limiting example of a base station can include, in the 3GPP specification, a Node B ("NB"), an enhanced Node B ("eNB"), a home eNB ("HeNB") or some other similar terminology. Another non-limiting example of a base station is an access point. An access point may be an electronic device that provides access for wireless terminal to a data network, such as (but not limited to) a Local Area Network ("LAN"), Wide Area Network ("WAN"), the Internet, etc. Although some examples of the systems and methods disclosed herein may be described in relation to given standards (e.g., 3GPP Releases 8, 9, 10, 11, 12, and thereafter), the scope of the present disclosure should not be limited in this regard. At least some aspects of the systems and methods disclosed herein may be utilized in other types of wireless communication systems.

As used herein, the term "telecommunication system" or "communications system" can refer to any network of devices used to transmit information. A non-limiting example of a telecommunication system is a cellular network or other wireless communication system.

As used herein, the term "cellular network" or "cellular radio access network" can refer to a network distributed over cells, each cell served by at least one fixed-location transceiver, such as a base station. A "cell" may be any communication channel that is specified by standardization or regulatory bodies to be used for International Mobile Telecommunications-Advanced ("IMTAdvanced"). All or a subset of the cell may be adopted by 3GPP as licensed bands (e.g., frequency band) to be used for communication between a base station, such as a Node B, and a UE terminal. A cellular network using licensed frequency bands can include configured cells. Configured cells can include cells of which a UE terminal is aware and in which it is allowed by a base station to transmit or receive information. Examples of cellular radio access networks include E-UTRAN, and any successors thereof (e.g., NUTRAN).

Incorporated herein by reference are the most recent versions of Release 13 of each of the following 3GPP Technical Specifications:

3GPP Technical Specification 36.304, "Evolved Universal Terrestrial Radio Access (E-UTRA); User Equipment (UE) procedures in idle mode";

3GPP TS 36.211 "Evolved Universal Terrestrial Radio Access (E-UTRA); Physical channels and modulation";

3GPP TS 36.133 "Evolved Universal Terrestrial Radio Access (E-UTRA); Requirements for support of radio resource management";

3GPP TS 36.331 "Evolved Universal Terrestrial Radio Access (E-UTRA); Radio Resource Control (RRC); Protocol specification"

Also incorporated herein by reference are the following:
1. RP-151109, Feasibility Study on LTE-based V2X Services
2. RP-152293, Support for V2V services based on LTE sidelink
3. R1-160575, Resource Pool for V2V, Samsung
4. R1-160366, Considerations on V2V traffic priority and relative resource allocation, CATT
5. R1-160636, Discussion on resource pool structure for PC5-based V2V, LGE
6. R1-160678, Location based resource selection on LTE sidelink for V2V services, SONY
7. R1-160679, Resource pool configurations on LTE sidelink for V2V services, SONY
8. R1-160682, Resource pool allocation enhancement for V2V, ZTE
9. R1-160689, Discussion on resource allocation and procedure for V2V, ZTE
10. R1-160895, Resource Pool Design for V2V, Qualcomm
11. R1-160909, On resource control/selection mechanisms for V2V operation, Nokia
12. R1-161031, Geo Based Resource Scheduling for V2V Communication, General Motors
13. R1-160360, Synchronization enhancements in PC5-based V2V, CATT
14. R1-160307, UE autonomous resource selection, Huawei
15. R1-160431, Support of geo-based transmission schemes for V2V communication, Intel
16. R1-161075, Discussion on V2X PC5 Scheduling, Resource Pools and Resource Patterns, Ericsson
17. 3GPP TR 22.885 V0.4.0 3rd Generation Partnership Project; Technical Specification Group Services and System Aspects; Study on LTE Support for V2X Services (Release 14)
18. 3GPP TS 36.331 V13.0.0

Vehicle (V2X) communication is a communication that involves a radio connection established between a transmit device and a receive device (e.g., a wireless terminal or UE), which radio communication may or may not transit via a base station node of the network, with at least of one the transmit device and the receive device being mobile, e.g., capable of being moved. Generic V2X encompasses one or more of vehicle to infrastructure (V2I) communication; vehicle to person/pedestrian (V2P) communication; and vehicle to vehicle (V2V) communication. Generally, there are three general scenarios which may occur in vehicle (V2X) communication. Those three general vehicle (V2X) communications scenarios are illustrated in FIG. 1. A first vehicle (V2X) communication scenario is an "in coverage" vehicle (V2X) communication scenario, illustrated between WT1 and WT2 of FIG. 1, in which both WT1 and WT2 are within coverage of the cellular radio access network. A second vehicle (V2X) communication scenario is a "partial coverage" scenario, illustrated between WT2 and WT3 of FIG. 1. In the "partial coverage" vehicle (V2X) communication scenario the wireless terminal WT2 is within coverage of the cellular radio access network, but the wireless terminal WT3 is out-of-coverage of the cellular radio access network. A third vehicle (V2X) communication scenario is an "out-of-coverage" scenario, illustrated between wireless terminal WT3 and wireless terminal WT4 of FIG. 1. In the out-of-coverage vehicle (V2X) communication scenario both the wireless terminal WT3 and the wireless terminal WT4 are out-of-coverage of the cellular radio access network.

The three vehicle (V2X) communication scenarios are described with reference to whether or not a participating wireless terminals (e.g., WTs) are "in coverage" or "out-of-coverage" of one or more cellular radio access networks (which may collectively be referred to as a "cellular radio access network"). For sake of simplicity FIG. 1 depicts "coverage" as being with respect to an access node BS such as eNodeB which comprises a cellular radio access network. It should be understood, however, that a wireless terminal may also be in coverage of the cellular radio access network when served by any cell of the cellular radio access network(s). For example, if wireless terminal WT1 and wireless terminal WT2 were served by different cells, when participating in vehicle (V2X) communication the wireless terminal WT1 and wireless terminal WT2 would still be in an in coverage vehicle (V2X) communication scenario.

Figure 2:
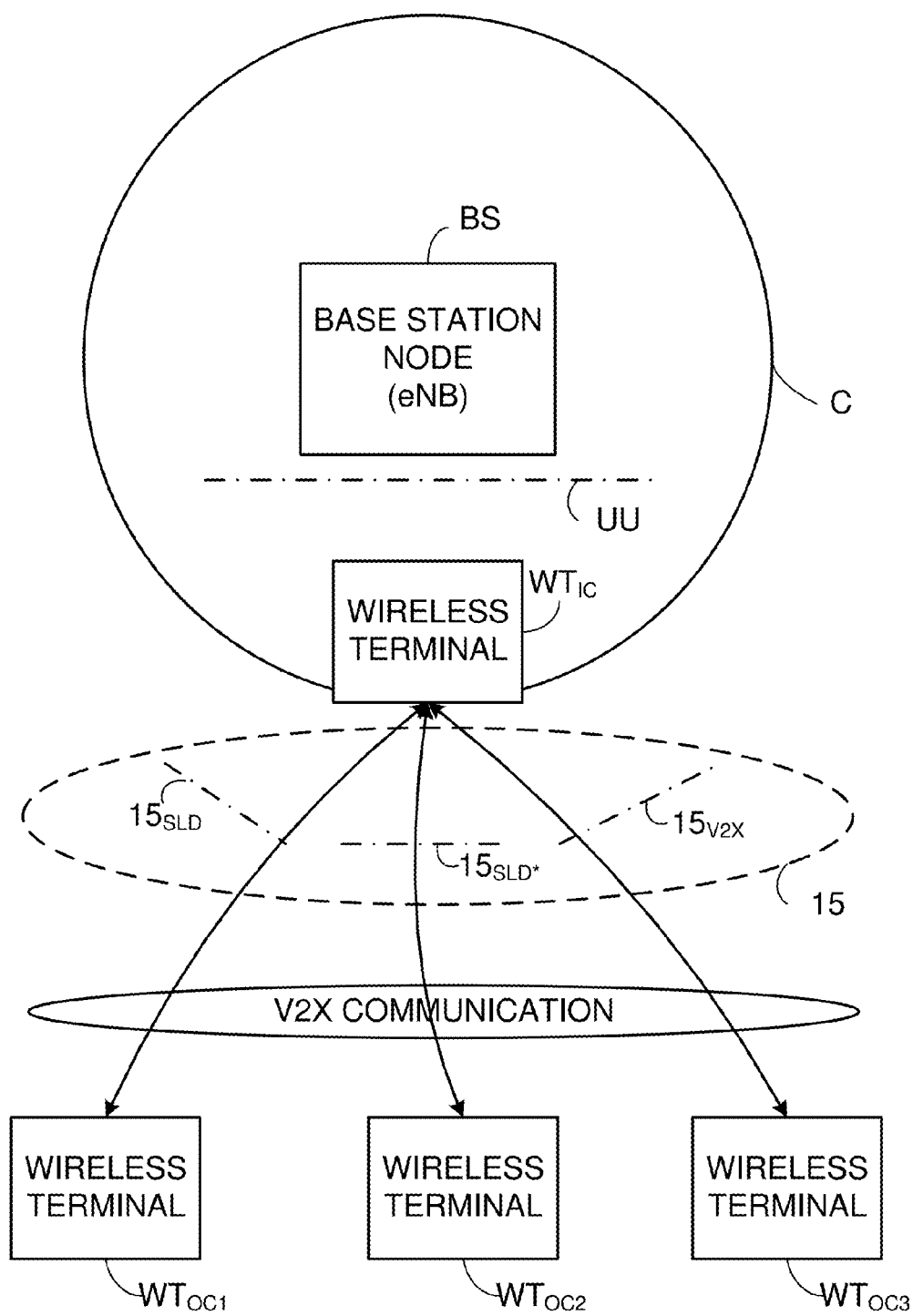
FIG. 2 is a diagrammatic view showing that, in differing implementations, V2X communication may be implemented either in conjunction with sidelink direct (SLD) communication, in conjunction with enhanced SLD, or apart from SLD as a separate V2X communication protocol.

As used herein and as illustrated in FIG. 2, V2X communication may be implemented in several ways. For illustrative context, FIG. 2 illustrates a base station node BS of a cellular radio access network which serves a cell C. The base station BS may communicate with a wireless terminal $WT_{IC}$ which is in coverage of the cellular radio access network over a radio interface UU. FIG. 2 further shows that wireless terminal $WT_{IC}$ may engage in vehicle (V2X) communication with one or more other wireless terminals which are outside of coverage of the cellular radio access network, particularly wireless terminal $WT_{OC1}$, wireless terminal $WT_{OC2}$, and wireless terminal $WT_{OC3}$. It is assumed that either wireless terminal $WT_{IC}$, or all of wireless terminal $WT_{OC1}$, wireless terminal $WT_{OC2}$, and wireless terminal $WT_{OC3}$ are mobile terminals for the communication to be vehicle (V2X) communication. Being "mobile" means that the wireless terminal is provided or situated in/with a mobile entity, such as a vehicle or a person.

As a first example implementation, V2X communication may be implemented using applications and resources of the type that were utilized for sidelink direct (SLD) communication (also known as device-to-device ("D2D") communication) before introduction of vehicle (V2X) communication. For example, when implemented as part of SLD communication the V2X communication may use resources and channels of the SLD communication scheme. In such first implementation the V2X communication may be said to be implemented using pre-V2X sidelink direct (SLD) protocol and over a pre-V2X sidelink direct (SLD) radio interface 15SLD.

As a second example implementation, V2X communication may be implemented using enhanced applications and enhanced resources utilized for sidelink direct (SLD) communication, e.g., sidelink direct communications augmented or enhanced with additional capabilities to accommodate vehicle (V2X) communication. In such second implementation the V2X communication may be said to be implemented using enhanced sidelink direct (SLD) protocol and over an enhanced sidelink direct (SLD) radio interface 15SLD*.

As a third example implementation, V2X communication may operate separately from sidelink direct (SLD) communication by, e.g., having separate and dedicated V2X communication resources and channels, and by being performed using application software which is specific to V2X communication. In such third implementation the V2X communication may be said to be implemented using separate vehicle (V2X) communications protocol and over a separate vehicle (V2X) communication radio interface 15V2X.

The fact that three example implementations are illustrated in FIG. 2 does not mean that a particular wireless terminal has to participate in all three or even two of the example implementations. FIG. 2 simply indicates the expansive meaning of the term vehicle (V2X) communication and that the technology disclosed herein encompasses vehicle (V2X) communication in all of its various existing and potential implementations.

The technology disclosed herein involves radio resource allocation criteria, e.g., radio resource selection and utilization for vehicle (V2X) communications, and particularly autonomous selection and utilization by a wireless terminal of radio resources for vehicle (V2X) communication according to radio resource allocation criteria. As in sidelink direct (SLD) communication (e.g., D2D communications), for the technology disclosed herein there are three ways in which a wireless terminal (e.g., user equipment [UE]), can obtain resource pools for autonomous selection: (1) eNB broadcast information; (2) eNB dedicated signaling; and (3) UE preconfigured information. The first of these ways, e.g., eNB broadcast signal, may be from a system information block (SIB) such as SIB18, and in an example implementation from an information element corresponding to or similar to the SLD information element "commTxPoolNormalCommon". For the second way, eNB dedicated signaling, the resource information may be carried in a dedicated message from the eNB to the wireless terminal, and in an example implementation such a message may be may correspond to or be similar to the message "RRCConnectionReconfiguration". For the third way, UE configured information, the information may be indicated by an information element corresponding to or similar to the SLD information element "preconfigComm"). When the wireless terminal is within the coverage of cellular radio access network (e.g., E-UTRAN), the wireless terminal uses one of the first two ways for communications if the resources are configured not to be scheduled by a node (e.g., base station or eNB) of the cellular radio access network. Then, when the wireless terminal is out of coverage, the wireless terminal uses the third way of obtaining the resource pool information for vehicle (V2X) communication.

Figure 6A:
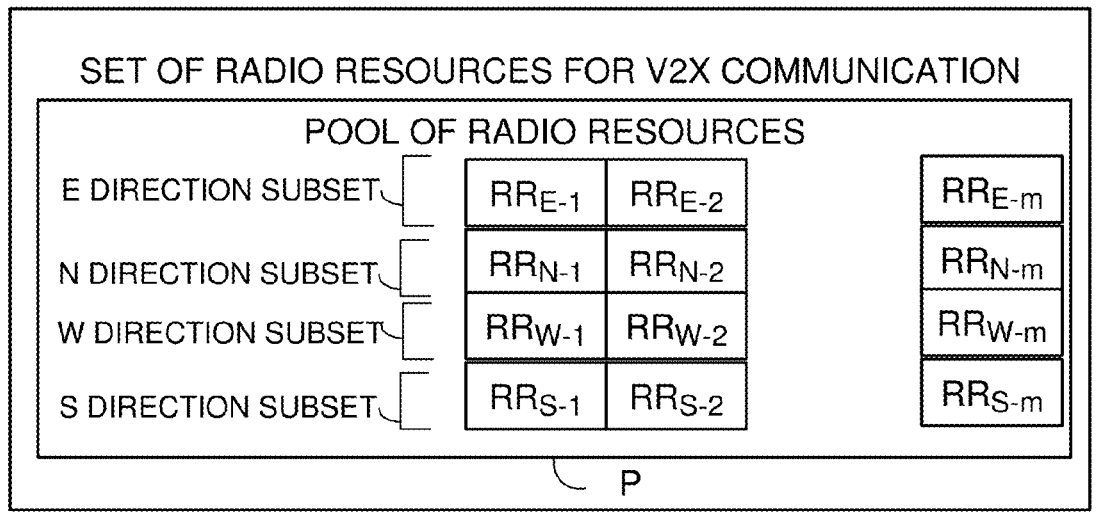
FIG. 6A is a diagrammatic view of a set of radio resource, and particularly showing the set as comprising a pool of radio resources, with different subsets of the pool being allocated to corresponding different directions.

As used herein, a "set" of radio resources may refer to a pool comprising plural radio resources (as subsequently illustrated with reference to FIG. 6A as an example) or a plurality of pools, each pool comprising one or more radio resources (as subsequently illustrated with reference to FIG. 6B as an example).

As used herein, "frequency" may be one kind of "radio resource". More typically a radio resource is defined in terms of both frequency domain and time domain, and may (for example in LTE) be implemented as a "resource block (RB)". As used herein, a "radio resource pool", or "pool", may comprise one radio resource pool or plural radio resource pools. Hence, "pool" is to be understood in at least some implementations to include "pools" and thus also to mean or be denoted as "pool(s)".

The total amount of radio resources available for vehicle (V2X) communication is usually fixed. Such being the case, an important issue is how to partition resources/resource pools, so as to let some wireless terminals (UEs) access some particular or all resources/resource pools. Different aspects of the technology disclosed herein pertain to differing allocation criteria for radio resources for vehicle (V2X) communications.

$1^{St}$ Embodiment: Direction-Dependent Radio Resource Allocation

In a first example embodiment and mode, the radio resource allocation criteria is direction-dependent, e.g., dependent on a direction (e.g., geographical compass direction) or orientation of a vehicle seeking allocation of radio resources for vehicle (V2X) communication. In particular, in the first example embodiment and mode a wireless terminal is configured to select radio resources for vehicle (V2X) communication in accordance with which one of plural potential directions corresponds to the direction of travel of the wireless terminal (e.g., of the wireless terminal or a vehicle in which the wireless terminal is situated, carried, or installed). The directions, e.g., the number of travel directions for the wireless terminal, may be in accordance with any suitable scheme of direction differentiation, as illustrated by the non-limiting examples of FIG. 3A, FIG. 3B, and FIG. 3C, each described below.

Figure 3A:
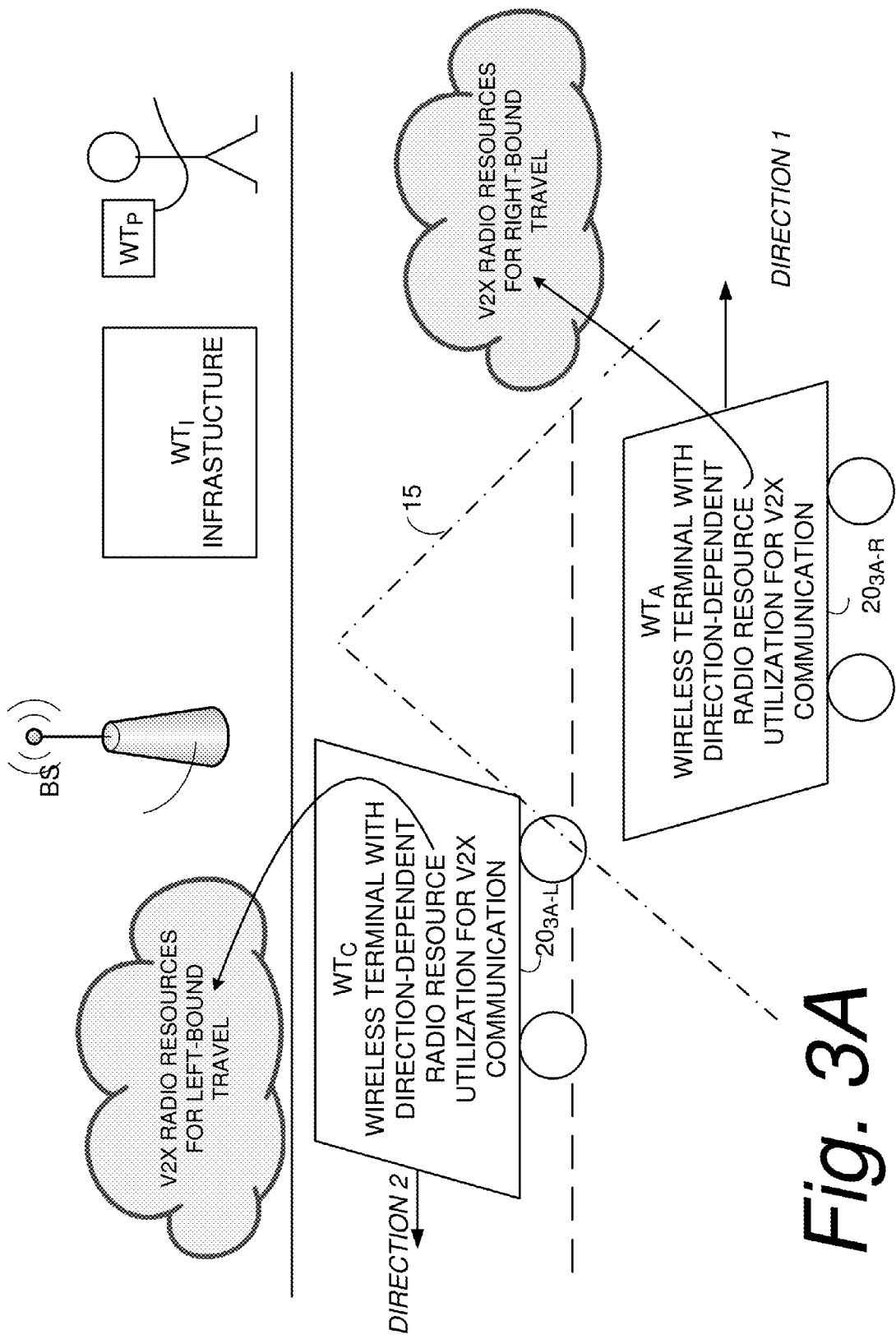
FIG. 3A is a diagrammatic view of an example wireless terminal configured to implement two direction-dependent radio resource selection and utilization for a vehicle (V2X) communication.

FIG. 3A shows example wireless terminals 20 configured to implement two direction-dependent radio resource selection and utilization for a vehicle (V2X) communication. In the scheme of FIG. 3A the wireless terminals 20 are traveling on a bi-directional roadway, having a right-bound lane shown below the median marker (indicated by a broken line) and a left-bound lane shown above the median marker. It so happens in FIG. 3A that wireless terminal $20_{3A-R}$ is traveling to the right ("direction 1") while another wireless terminal $20_{3A-L}$ is traveling to the left ("direction 2"). When the wireless terminals of FIG. 3A desire to participate in vehicle (V2X) communications, a radio resource must be selected by each wireless terminal from a set of V2X radio resources. However, in view of the direction-dependent radio resource allocation described herein, the right-traveling wireless terminal $20_{3A-R}$ has access to a first subset of radio resources, e.g., those associated with right-bound direction of travel, rather than to the entire set of V2X radio resources. On the other hand, the left-traveling wireless terminal $20_{3A-L}$ has access to a second subset of radio resources, e.g., those associated with right-bound direction of travel. As used herein, the radio resources of a first subset of radio resources is preferably orthogonal to the radio resources of a second subset of radio resources (and any higher number of subsets) of for vehicle (V2X) communication. Thus, the resources used by the two lanes, e.g., by the two directions in FIG. 3A, are different in order to reduce interference from each other (different resource pools or different subsets of radio resource mean the resources used are orthogonal to each other).

Figure 3B:
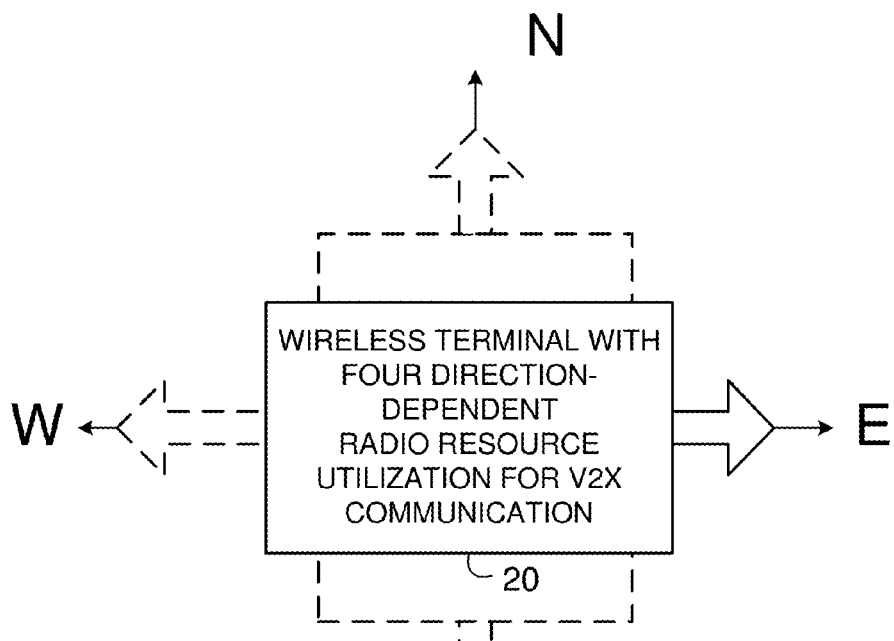
FIG. 3B is a diagrammatic view of an example wireless terminal configured to implement four direction-dependent radio resource selection and utilization for a vehicle (V2X) communication.

FIG. 3B shows an example wireless terminal 20 configured to implement four direction-dependent radio resource selection and utilization for a vehicle (V2X) communication. The four directions illustrated in the context of FIG. 3B are the four ninety-degree-separated points of geographic compass, e.g., East (E), North (N), West (W), and South (S), taken in counter-clockwise order. In the scheme of FIG. 3B the wireless terminal 20 may be traveling on any type of roadway or other type of terrestrial surface, either as being incorporated in or carried by a vehicle or person. As understood herein, each of the four directions E, N, W, S has an associated subset of radio resources allocatable for wireless terminals traveling in their respective direction.

Figure 3C:
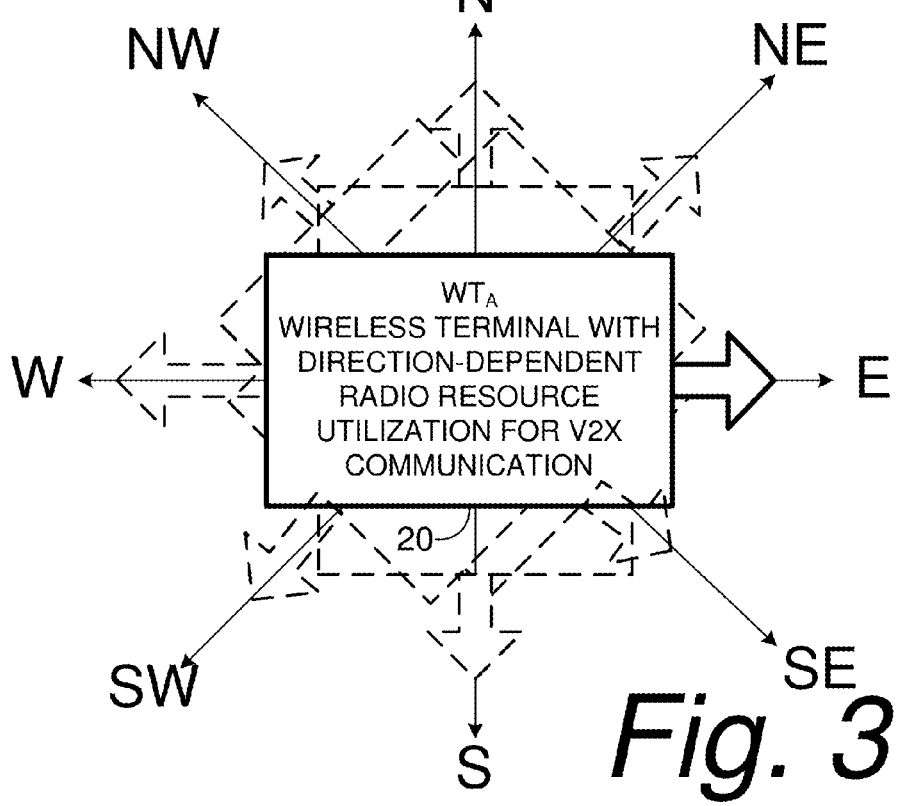
FIG. 3C is a diagrammatic view of an example wireless terminal configured to implement eight direction-dependent radio resource selection and utilization for a vehicle (V2X) communication.

FIG. 3C shows an example wireless terminal 20 configured to implement eight direction-dependent radio resource selection and utilization for a vehicle (V2X) communication. The eight directions illustrated in the context of FIG. 3C include the four ninety-degree-separated points of geographic compass of FIG. 3B, e.g., East (E), North (N), West (W), and South (S), as well as forty-five degree intermediate directions NorthEast (NE), NorthWest (NW), SouthWest (SW), and SouthEast (SE). Thus, in counterclockwise order the directions of FIG. 3C are E, NE, N, NW, W, SW, S, and SE. In the scheme of FIG. 3C the wireless terminal 20 may be traveling on any type of roadway or other type of terrestrial surface, either as being incorporated in or carried by a vehicle or person. As understood herein, each of the eight directions E, NE, N, NW, W, SW, S, and SE has an associated subset of radio resources allocatable for wireless terminals traveling in their respective direction. Thus, for FIG. 3C the set of radio resource is partitioned or divided into eight subsets.

For each of FIG. 3A, FIG. 3B, and FIG. 3C, access to the vehicle (V2X) communication radio resources may be, e.g., for any type of V2X service, such as V2I communication (e.g., with wireless terminal wireless terminal $20_1$ of FIG. 3A) or V2P communication (e.g., with wireless terminal $30_P$ carried by a pedestrian shown in FIG. 3A), each such V2X communication being across vehicle (V2X) communication radio interface 15. Moreover, it will be appreciated that one or both of the wireless terminals participating in the vehicle (V2X) communications of FIG. 3A, FIG. 3B, or FIG. 3C may either be out-of-coverage of a cellular radio access network (the cellular radio access network being represented by base station BS in FIG. 3A).

It should be understood that the example implementations of FIG. 3A, FIG. 3B, and FIG. 3C are non-limiting illustrations of direction naming conventions. Other direction conventions may be utilized in other example implementations and are encompassed hereby, such as a zero degree to three hundred sixty degree direction orientation, in degree or other (e.g., multi-degree) gradients.

Figure 4:
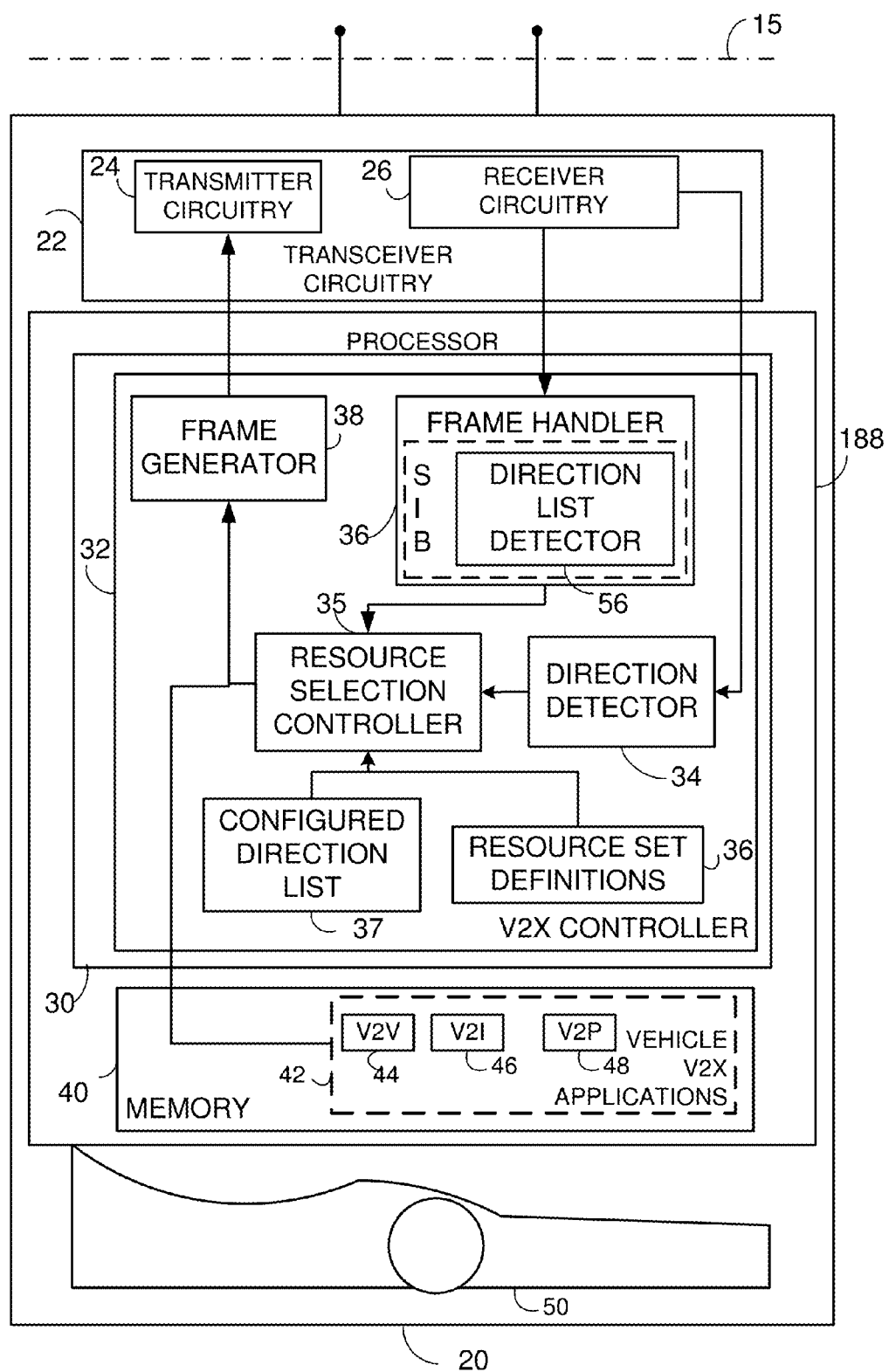
FIG. 4 is a schematic view of an example embodiment of a generic wireless terminal configured to implement a generic direction-dependent radio resource selection and utilization for vehicle (V2X) communications.

FIG. 4 shows various example, representative, non-limiting components and functionalities herein pertinent of a generic wireless terminal 20 configured for direction-dependent radio resource allocation for vehicle (V2X) communications. The wireless terminal 20 comprises transceiver circuitry 22, which in turn comprises transmitter circuitry 24 and receiver circuitry 26. The transceiver circuitry 22 includes antenna(e) for the wireless terminal 20. Transmitter circuitry 24 includes, e.g., amplifier(s), modulation circuitry and other conventional transmission equipment. Receiver circuitry 26 comprises, e.g., amplifiers, demodulation circuitry, and other conventional receiver equipment. The transceiver circuitry 22 is configured to use resources allocated for V2X communication, whether those resources be shared with sidelink direct (SLD) communications or separate and distinct for V2X communication as previously described.

The wireless terminal 20 further comprises processor circuitry, also herein known more simply as processor 30. While processor 30 may have responsibility for operation of many aspects of wireless terminal 20 not specifically described herein, in one of its aspects processor 30 serves as a VCX controller 32 for controlling aspects of vehicle (V2X) communication. As further illustrated in FIG. 4, the VCX controller 32 in turn comprises frame handler 33, direction detector 34; resource selection controller 35; resource set definitions 36, configured direction list 37, and frame generator 38.

In addition to the processor circuitry 30, wireless terminal 20 also comprises memory 40 (e.g., memory circuitry) which may store an operating system and various application programs, such as vehicle (V2X) communication applications 44 (including V2I application 46, V2V (vehicle-to-vehicle) application 47 and V2P (vehicle-to-pedestrian) application 48, discussed above. The memory 40 may be any suitable type of memory, e.g., random access memory (RAM), read only memory (ROM), cache memory, processor register memory, or any combination of one or more memory types. The applications such as V2X applications 44 comprise instructions executable by processor circuitry 30 and are stored in non-transient portions of memory 40.

The wireless terminal 20 further comprises user interface(s) 50. The user interfaces 50 may comprise one or more suitable input/output devices which are operable by a user. Some of all of the user interfaces 50 may be realized by a touch sensitive screen. The user interface(s) 50 may also comprise a keyboard, audio input and output, and other user I/O devices. Only a portion of the user interfaces 50 is depicted in FIG. 4, it being understood that the user interfaces 50 may be provided on a cover or case of wireless terminal 50 and thus may visibly obscure the underlying other components shown in FIG. 4.

In the example FIG. 4, the direction detector 34 determines a direction/orientation of travel of the wireless terminal 20. Direction detection may be accomplished in any of several ways, including conventionally known ways. For example, the direction detector 34 may utilize Global Positioning System (GPS or ALPS) technology, and thereby communicate with GPS satellites and nodes (e.g., using transceiver circuitry 22 as depicted in FIG. 4). When in coverage of a cellular radio access network the direction detector 34 may even use signals of the radio access network in order to obtain a sense of direction. Alternatively or additionally the direction detector 34 may comprise an on-board compass or the like suitable for providing direction of travel-indicating signals to processor 30.

The processor 30 uses the direction of travel information provided by direction detector 34 to determine or select a radio resource for use by the wireless terminal for a vehicle (V2X) communication. Such determined or selected radio resource is herein also known as the "selected radio resource". After determination of the selected radio resource, the transceiver circuitry 22 uses the selected radio resource for the vehicle (V2X) communication.

In an example embodiment and mode the processor 30 obtains a direction-dependent resource list 54 (see FIG. 5), also known herein as the "direction list". The direction list 54 may be obtained from a cellular radio access network and/or may be configured at the wireless terminal 20. In terms of network receipt, FIG. 4 shows that frame handler 33 comprises direction list detector 56 that obtains and stores the direction list 54 as received from the radio access network. As further shown in FIG. 5, the direction list 54 may be obtained from a system information block (SIB), such as SIB 58, received in a broadcast from the cellular radio access network. Alternatively or additionally, the direction list may be configured (e.g., pre-configured) at processor 30, as represented by configured direction list 37 in FIG. 4. The configured direction list 37 may be stored or maintained in memory 40 or elsewhere and be available to processor 30.

The direction list 54 comprises plural members corresponding to plural pre-defined directions (such as E, N, W, and S, in the example implementation of FIG. 3B, for example). Each of the plural members respectively comprises an identifier of a subset of a set of radio resources. Each of the plural subsets is associated with a corresponding one of plural pre-defined directions.

Figure 5:
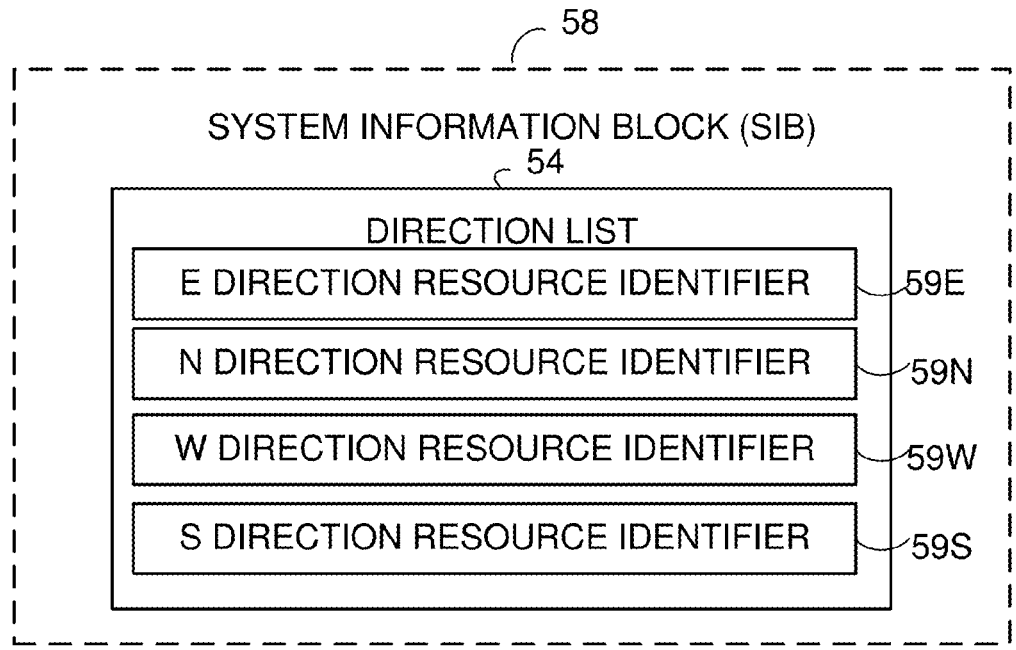
FIG. 5 is a diagrammatic view of a direction list for direction-dependent radio resource selection and utilization for vehicle (V2X) communications, and particularly showing an example, non-limiting implementation wherein the direction list is in the context of a system information block.

FIG. 5 shows an example direction list 54 for a four direction implementation. By way of non-limiting example, the direction list 54 is illustrated and described with respect to the four direction example implementation of FIG. 3B. As such, the direction list 54 comprises four members: a first member which serves as an East (E) direction resource identifier 59E; a second member which serves as a North East (N) direction resource identifier 59N; a third member which serves as a West (W) direction resource identifier 59W; and, a fourth member which serves as a South (S) direction resource identifier 59S. FIG. 5 happens to show that direction list 54 is obtained from a system information block (SIB) 58, but in view of the preceding discussion it should be understood that the direction list 54 could alternatively be configured at the wireless terminal and thus stored in configured direction list 37.

The radio resource identifiers 59 may take any of several possible forms. For example, the content of a radio resource identifier 59 may itself serve as a listing, definition, or identification of the radio resources comprising the respective subset. Preferably the radio resource identifiers 59 serve as pointers or mapping indicators to the respective subsets of radio resources. For example, the set of radio resources for V2X may be defined or stored in a memory such as resource set definitions 36, and for a given subset the location or whereabouts of the subset in the set is indicated by the corresponding radio resource identifier 59. For example, radio resource identifier 59E may point to a certain memory location or position in an array in resource set definitions 36 which begins a partition of the set of radio resources which are allowed for use when the wireless terminal 20 travels in an east direction.

In accordance with the direction of travel of the wireless terminal, as determined by direction detector 34, the processor 30 consults the member of direction list 54 which corresponds to the detected direction of travel, and then uses the corresponding member of direction list 54 to identify radio resources which are eligible for selection in view of the direction of travel. For example, if the detected direction of travel is east, the processor 30 consults direction resource identifier 54E. The direction resource identifier 54E lists, identifies, or points to a subset of eligible radio resources. From the eligible radio resources, the processor resource selection controller 35 selects the "selected" radio resource for use in the vehicle (V2X) communication.

As mentioned above, the set of radio resources may comprise one or more pools. In a situation illustrated in FIG. 6A, the set of radio resource comprises one pool P. The pool P in turn comprises several subsets, an in particular in view of the direction-dependent subset classification hereof includes a subset for each of plural predetermined directions. For example, the pool P of FIG. 6A comprises a first subset (East direction subset) which in turn comprises radio resources $RR_{E-1}$ through $RR_{E-m}$; a second subset (North direction subset) which in turn comprises radio resources $RR_{N-1}$ through $RR_{N-m}$; a third subset (West direction subset) which in turn comprises radio resources $RR_{W-1}$ through $RR_{W-m}$; and a fourth subset (South direction subset) which in turn comprises radio resources $RR_{S-1}$ through $RR_{S-m}$. It should be understood that, in an example implementation, the respective radio resource identifiers 59E, 59N, 59W, and 59S may respectively point to the memory locations for the corresponding direction subsets.

Figure 6B:
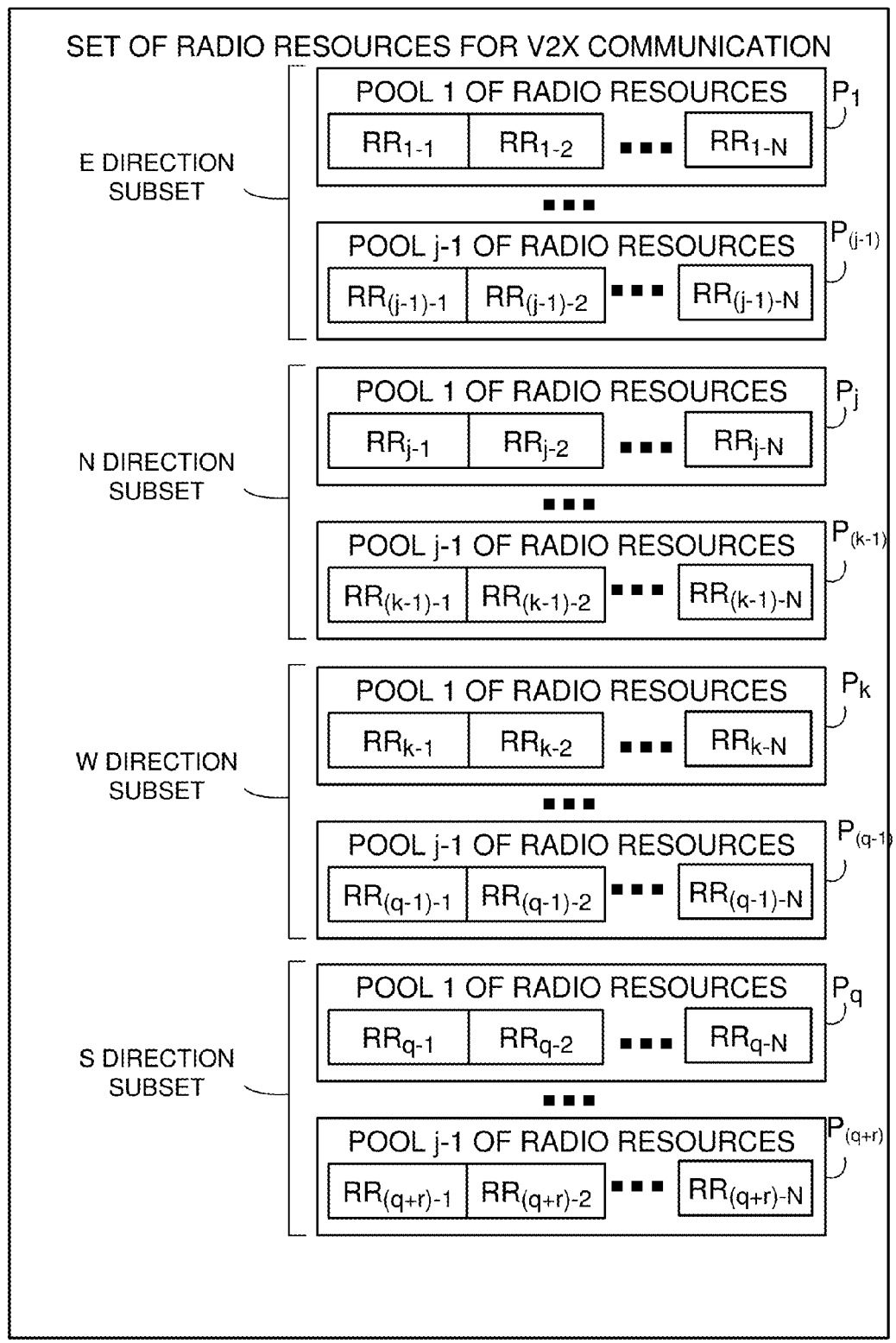
FIG. 6B is a diagrammatic view of a set of radio resource, and particularly showing the set as comprising a plural pools of radio resources, with different subsets of the plural pools being allocated to corresponding different directions.

In a situation illustrated in FIG. 6B, the set of radio resource comprises plural pools $P \ldots P_{(q+r)}$, with each subset comprising one or more pools. In the non-limiting example implementation of FIG. 6B, a first subset of radio resources (East direction subset) comprises pools $P_1$ through $P_{j-1}$; a second subset of radio resources (North direction subset) comprises pools $P_j$ through $P_{k-1}$; a third subset or radio resources (West direction subset) comprises pools $P_k$ through $P_{q-1}$; and a fourth subset or radio resources (South direction subset) comprises pools $P_q$ through $P_{q+r}$. Each pool comprises plural radio resources.

Figure 7:
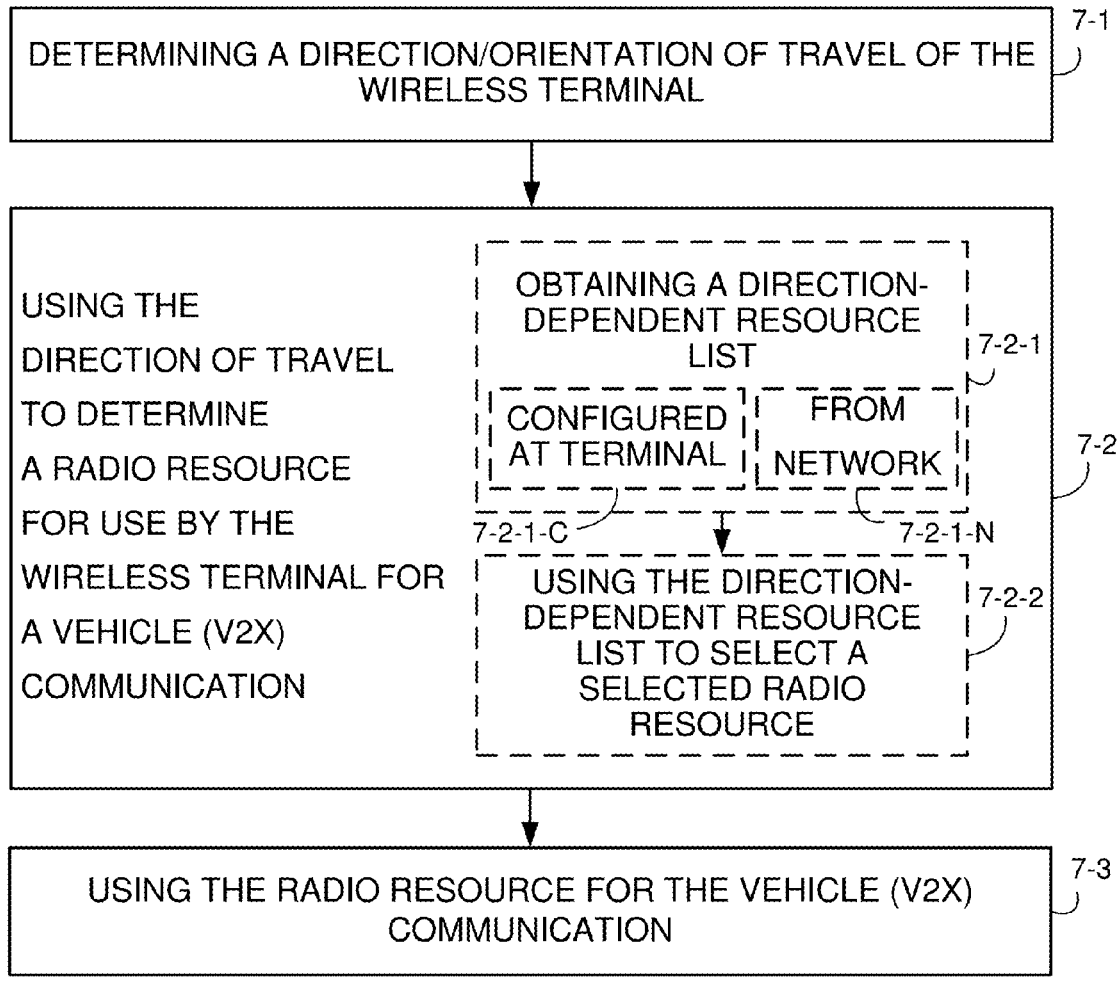
FIG. 7 is a flowchart depicting basic, example acts or steps involved in generic method of operating a wireless terminal configured to implement a generic direction-dependent radio resource selection and utilization for vehicle (V2X) communications.

FIG. 7 is a flowchart depicting basic, example acts or steps involved in generic method of operating the generic wireless terminal 20 of FIG. 4. Act 7-1 comprises determining a direction/orientation of travel of the wireless terminal. Act 7-2 comprises using the direction of travel to determine a radio resource for use by the wireless terminal for a vehicle (V2X) communication. Act 7-3 comprises using the radio resource for the vehicle (V2X) communication.

As understood from the preceding discussion, in a non-limiting example embodiment and mode act 7-2 may in turn comprise act 7-2-1 and act 7-2-2. Act 7-2-1 comprises obtaining a direction-dependent resource list. As explained above, the direction-dependent resource list comprises plural members corresponding to plural pre-defined directions, each of the plural members respectively comprising an identifier of a subset of a set of radio resources, each of plural subsets being associated with a corresponding one of plural pre-defined directions. The direction list 54 may be obtained from a cellular radio access network (as indicated by act 7-2-1-N), or be configured at the wireless terminal (as indicated by act 7-2-1-C). Act 7-2-2 comprises, in accordance with the direction of travel of the wireless terminal, using the direction-dependent resource list to select a selected radio resource.

It is possible to use road boundary to partition resource pools, with some type of mapping between resource pools and road or traffic boundaries. However, use of road boundaries may cause too many small partitions and entail enormous map maintenance in view of, e.g., road construction or a same lane being different directions at different times (either periodically or temporarily). Such road boundary-defined maps thus have to be updated accordingly. On the other hand, if the set of radio resource is further classified or partitioned with respect to traffic direction, as herein described, then no update work may be needed. Rather, a wireless terminal can transmit using a subset of radio resources which match the direction of travel of the wireless terminal.

Moreover, in an example, non-limiting variation, the resource selection controller 35 may be further configured to select the selected radio resource in dependence on an additional allocation criteria other than direction of travel. For example, the resource selection controller 35 may be programmed not only to use direction of travel as a determining factor for selection of the selected radio resource, but another allocation factor as well. One example of such other allocation factors or allocation criteria may include geographical area mapping (in which the set is subdivided or partitioned into geographical regions). Another example allocation factor or criteria may be service type, e.g., whether the V2X service is V2V, V2I, or V2P, for example. Another example allocation factor or criteria may be nature of event triggering the vehicle (V2X) communication. For example, one triggering event may be an emergency, another triggering event may be non-emergency.

Figure 6C:
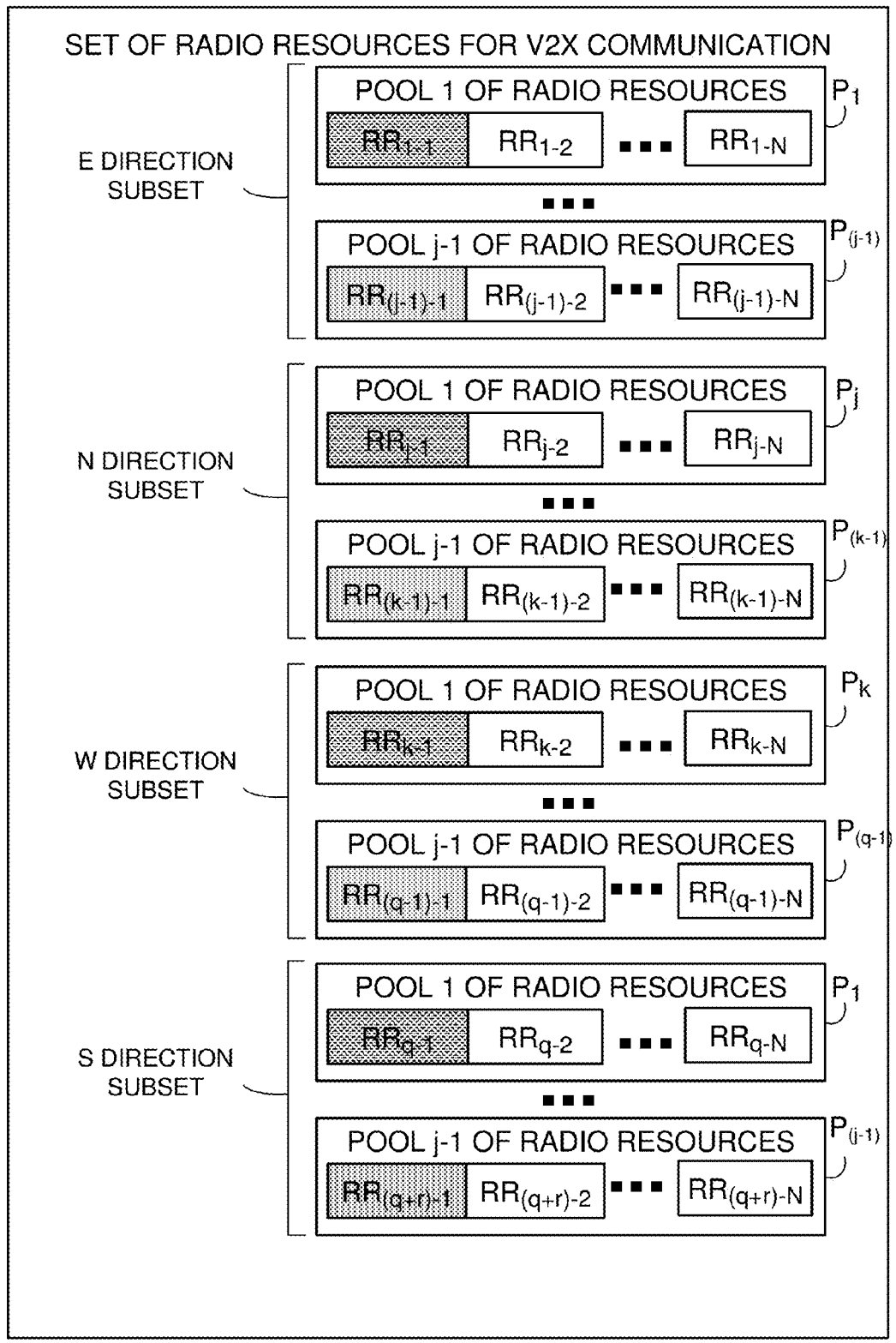
FIG. 6C is a diagrammatic view of a set of radio resource, and particularly showing the set as comprising a plural pools of radio resources, with different subsets of the plural pools being allocated to corresponding different directions and also showing radio resource allocation according to other example allocation criteria.

In view of the foregoing, FIG. 6C shows a non-limiting implementation wherein the set of radio resources comprises plural pools in the manner of FIG. 6B, with each of the directions E, N, W, and S having an associated subset of resources (each subset comprising one or more pools). But FIG. 6C further shows how resource selection controller 35 may be constrained to select a radio resource not only on the basis of direction of travel, but some other allocation criteria or factor as well. For example, if the resource selection controller 35 is directed in a certain situation to use radio resources specially allocated or reserved for V2I service, the resource selection controller 35 may be restrained to use one of the radio resources shown with stippled interior in FIG. 6C (e.g., one of radio resources RR1-1, RRj-1, RRk-1, or RRq-1. Thus, for example, if the wireless terminal were traveling east bound and a V2I service initiated, the resource selection controller 35 would choose V2I-eligble radio resource $RR_{1-1}$ from the first (East) subset of radio resources. Furthermore, resource selection controller 35 may utilize more than two allocation factors or criteria, as indicated by other radio resources of FIG. 6C which have internal vertical striping.

Figure 8:
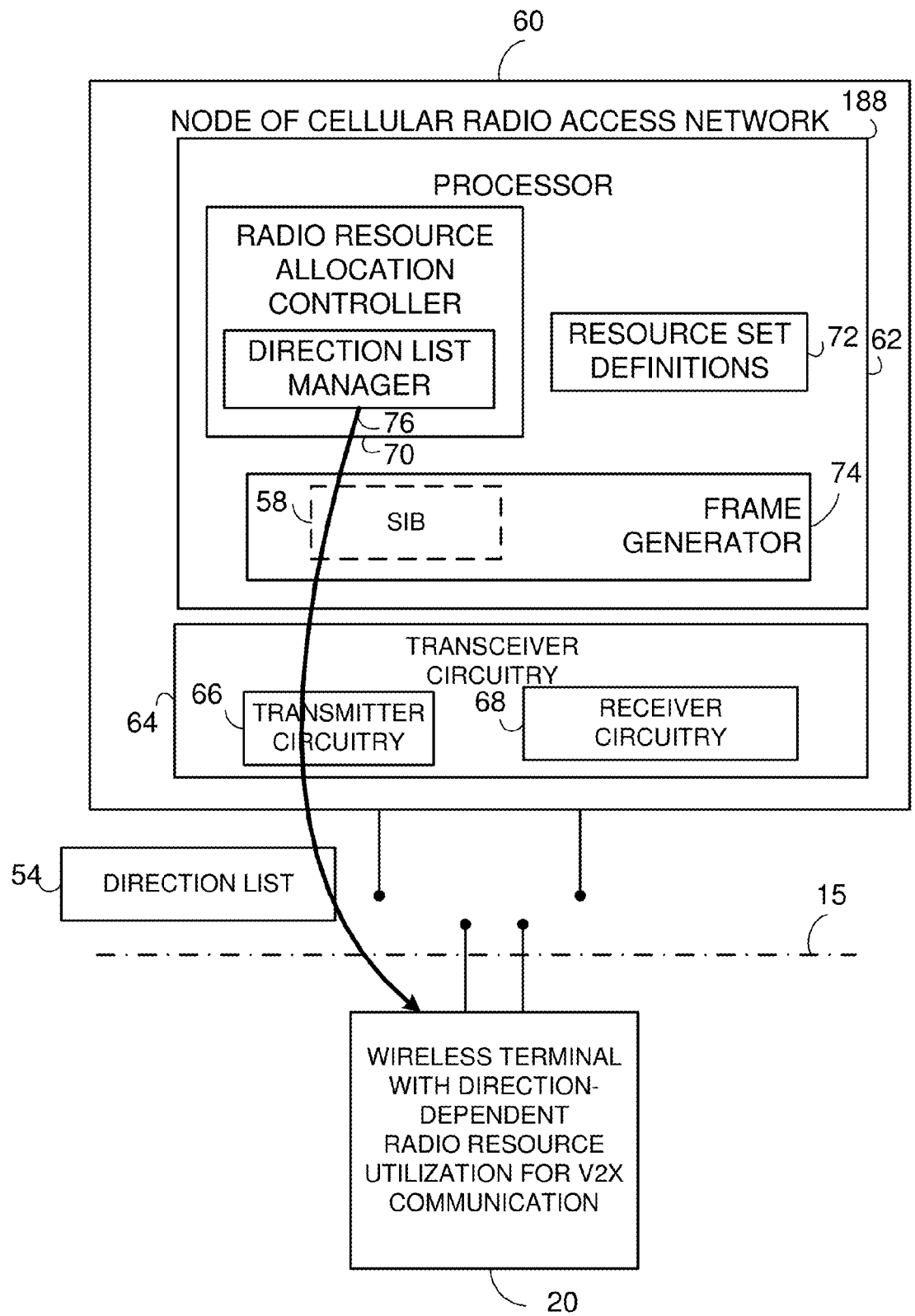
FIG. 8 is a schematic view of an example node of a cellular radio access network configured to facilitate implementation of direction-dependent radio resource selection and utilization for vehicle (V2X) communications.

FIG. 8 illustrates node 60 of a cellular radio access network which facilitates use by the wireless terminal 20 of direction-dependent radio resource selection. The node 60 may be a base station node, such as an eNodeB (e.g., eNB) for example. The node 60 comprises processor circuitry 62 and transceiver circuitry 64. The transceiver circuitry 64 in turn comprises transmitter circuitry 66 and receiver circuitry 68. The processor circuitry 62 comprises radio resource allocation controller 70, resource set definitions 72, and frame generator 74. FIG. 8 further shows that radio resource allocation controller 70 comprises direction list manager 76, and that the frame generator 74 generates system information block (SIB) 58.

Figure 9:
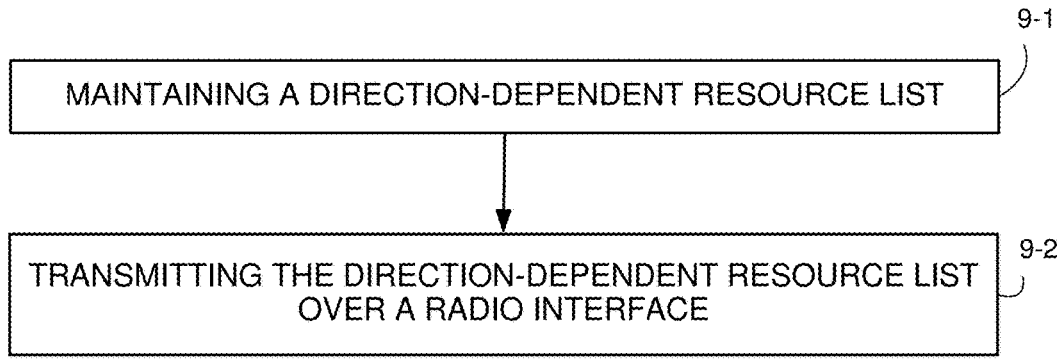
FIG. 9 is a flowchart depicting basic, example acts or steps involved in generic method of operating a node of a cellular radio access network in facilitating implementation of a direction-dependent radio resource selection and utilization for vehicle (V2X) communications.

FIG. 9 shows example, representative, non-limiting acts or steps performed by the node 60 of FIG. 8. Act 9-1 comprises the radio resource allocation controller 70, and direction list manager 76 in particular, maintaining the direction-dependent resource list 54. As explained above with example reference to FIG. 5, the direction-dependent resource list 54 comprises plural members corresponding to plural pre-defined directions of potential travel of a wireless terminal in coverage of the cellular radio access network, each of the plural members respectively comprising an identifier of a subset of a set of radio resources for use in vehicle (V2X) communication, each of plural subsets being associated with a corresponding one of plural pre-defined directions. Rather than refer to the identifiers by name, they may be numbered such as 1" for east, "2" for north, etc. Act 9-2 comprises transmitter circuitry 66 transmitting the direction-dependent resource list 54 over a radio interface; e.g., to the wireless terminal. The direction-dependent resource list 54 may be broadcasted by the node to the wireless terminal, or signaled by the node to the wireless terminal through dedicated signaling. When transmission is between the node and the wireless terminal, the air interface over which the direction-dependent resource list 154 is transmitted is the legacy Uu interface. In an example embodiment and mode, the direction list 54 is transmitted in a radio frame or subframe, and in an example implementation the direction list 54 is included in a system information block (SIB) 58.

$2^{Nd}$ Embodiment: Density-Dependent Radio Resource Allocation

In a second example embodiment and mode, the radio resource allocation criteria is density-dependent, e.g., dependent on density of active wireless terminals seeking allocation of or using radio resources for vehicle (V2X) communication, e.g., density of wireless communications in an area pertinent to a wireless terminal making selection of radio resources for vehicle (V2X) communication.

Figure 10A:
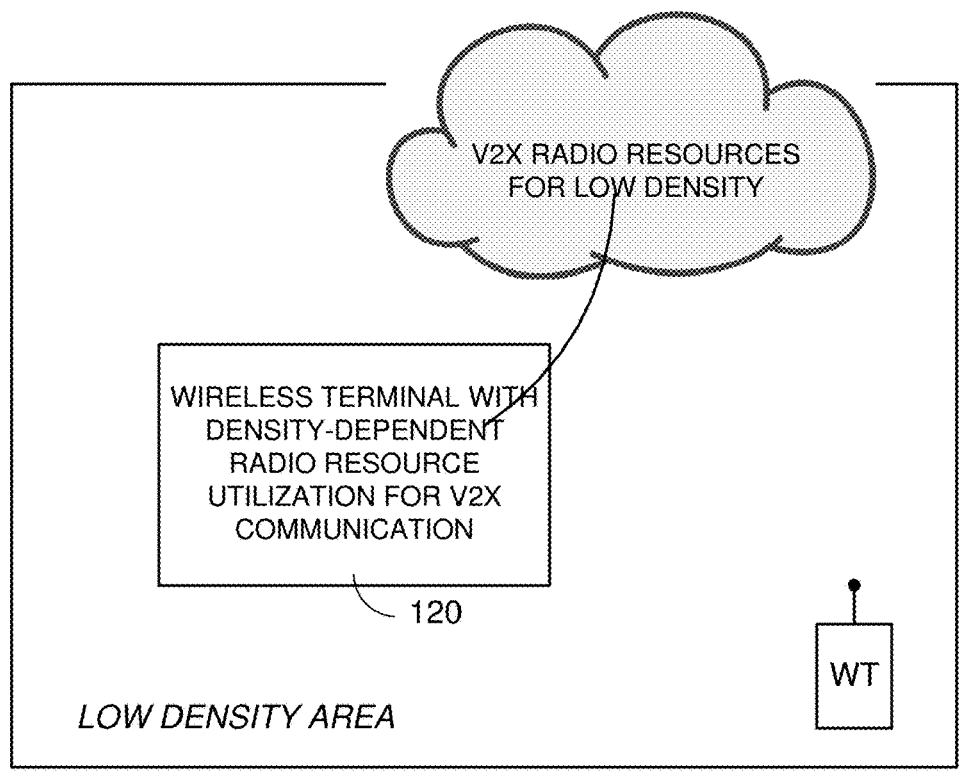
FIG. 10A, FIG. 10B, FIG. 10C, and FIG. 10D are diagrammatic views of an example wireless terminal configured to implement density-dependent radio resource selection and utilization for a vehicle (V2X) communication according to a first concept of density comprising number of wireless terminals, with FIG. 10A showing the wireless terminal in a low density area.
Figure 10B:
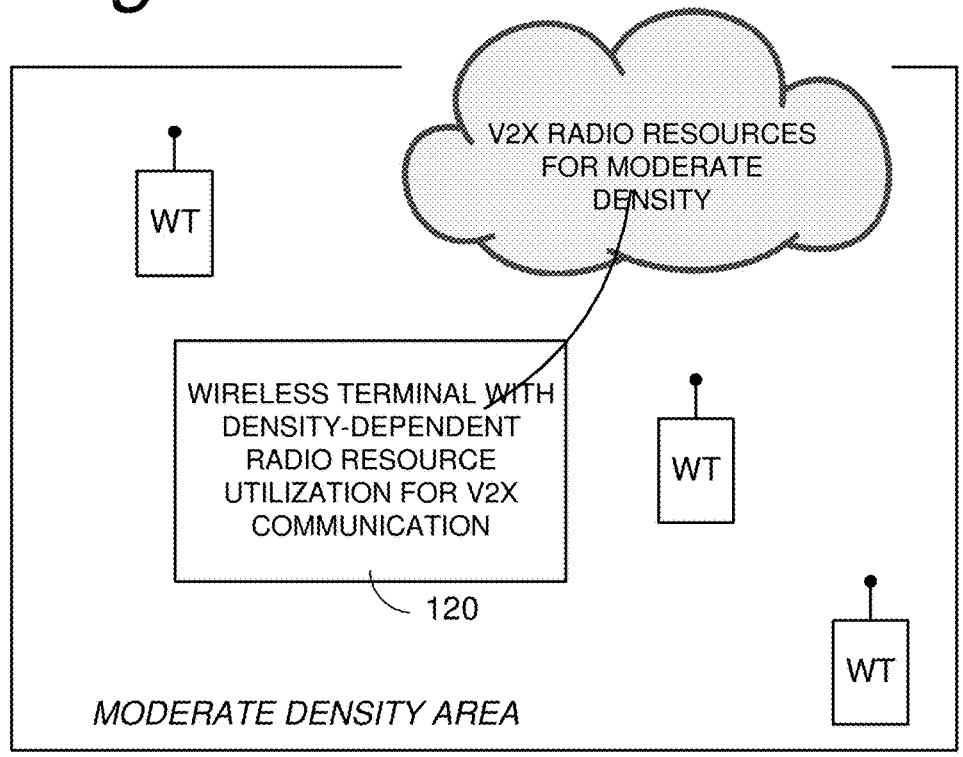
Figure 10C:
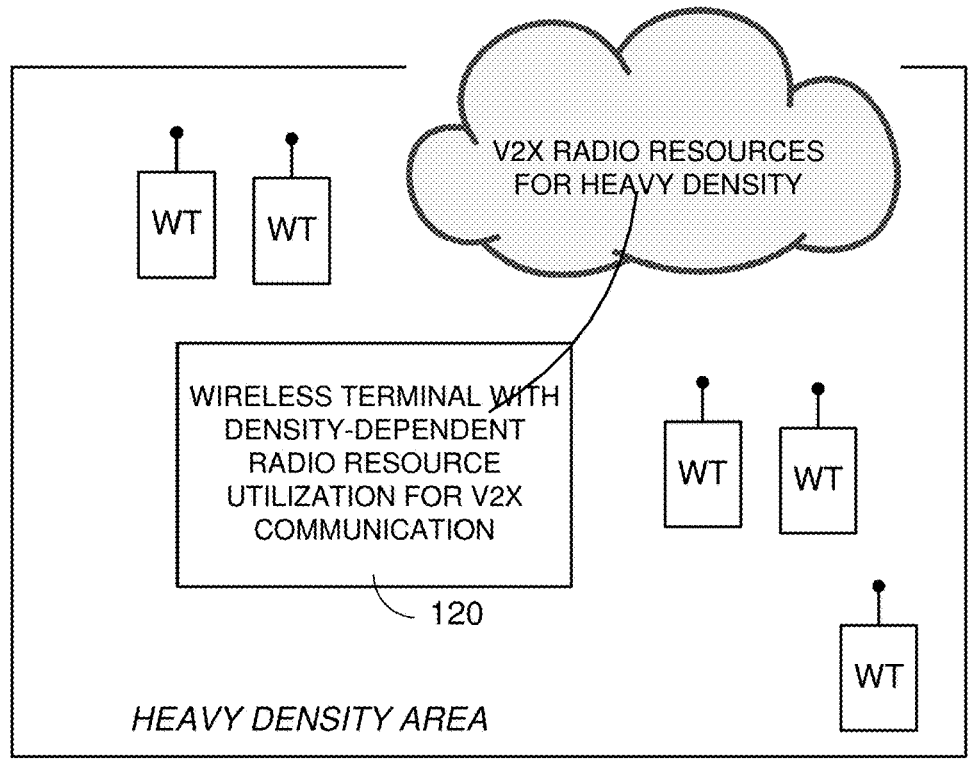
Figure 10D:
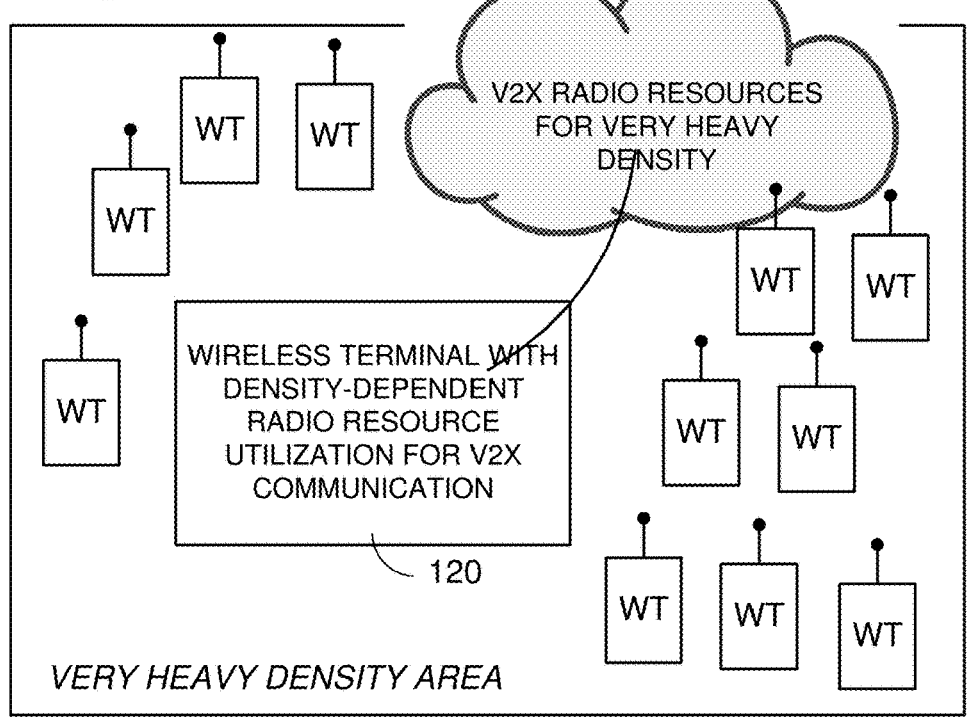

FIG. 10A, FIG. 10B, FIG. 10C, and FIG. 10D illustrate one example non-limiting concept of wireless communication density, e.g., wireless terminal traffic density. In particular, FIG. 10A shows the wireless terminal 120 in a low density area; FIG. 10B shows the wireless terminal 120 in a moderate density area; FIG. 10C shows the wireless terminal 120 in a high density area; and FIG. 10D shows the wireless terminal 120 in a very high density area. As explained below, for each type of density—low (L), moderate (M), high (H), and very high (VH)—a different subset of radio resources is available for vehicle (V2X) communication.

Figure 11A:
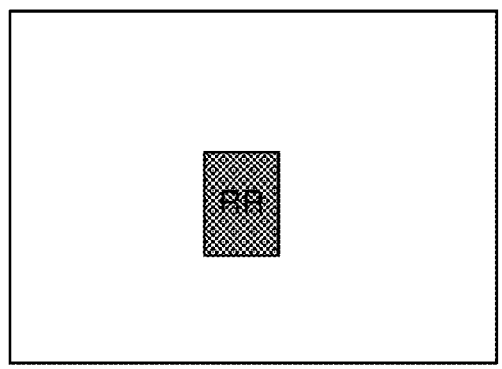
FIG. 11A, FIG. 11B, FIG. 11C, and FIG. 11D are diagrammatic views of an example wireless terminal configured to implement density-dependent radio resource selection and utilization for a vehicle (V2X) communication according to a second concept of density comprising extend of usage or load on radio resources, with FIG. 11A showing the wireless terminal in a low density area.
Figure 11B:
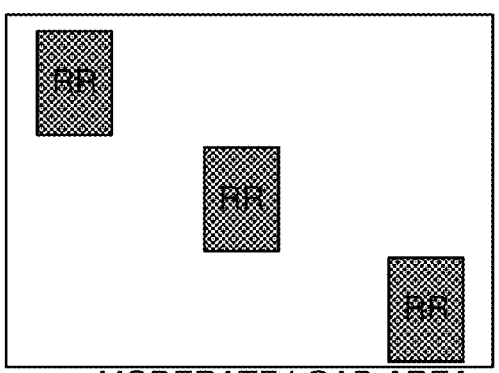
Figure 11C:
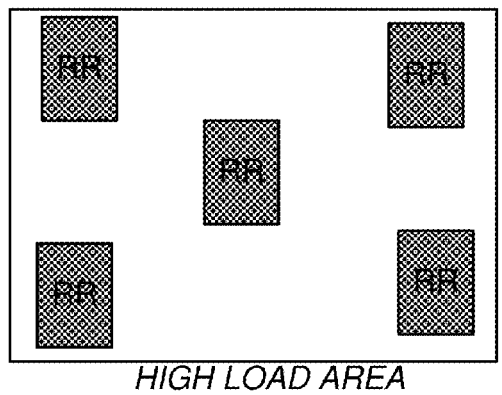
Figure 11D:
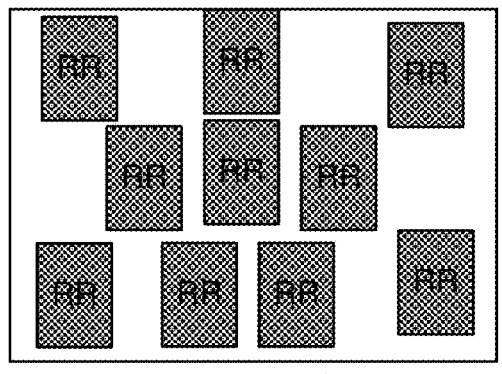

FIG. 11A, FIG. 11B, FIG. 11C, and FIG. 11D illustrate another example non-limiting concept of wireless communication density in which resource allocation criteria is usage or load-dependent, e.g., dependent on load or amount of communication resources being used of wireless terminals seeking allocation of or using radio resources for vehicle (V2X) communication. It will be recognized that such load may be dependent on the number of wireless terminals in an area pertinent to a wireless terminal making selection of radio resources for vehicle (V2X) communication, but may not be entirely dependent thereon. For example, one or more of the wireless terminals may be engaging in more than one vehicle (V2X) communication, and moreover the extent of radio resources utilized by one or more vehicle (V2X) communications may be more than others. Thus, FIG. 11A, FIG. 11B, FIG. 11C, and FIG. 11D illustrate another example non-limiting concept of wireless communication density, e.g., density or load/usage of radio resources. Each of FIG. 11A, FIG. 11B, FIG. 11C, and FIG. 11D depicts both a geographical area of usage and superimposed thereon an extent of use of a resource pool or the like available for vehicle (V2X) communication. In particular, in each of FIG. 11A, FIG. 11B, FIG. 11C, and FIG. 11D, a checkered rectangle bearing the letters "RR" represent an extent or degree of the overall resource pool (the overall resource pool being depicted by the outer rectangle in each of FIG. 11A, FIG. 11B, FIG. 11C, and FIG. 11D). In particular, FIG. 11A shows a low load/usage/density area; FIG. 11B shows a moderate load/usage/density area; FIG. 11C shows a high load/usage/density area; and FIG. 11D shows a very high load/usage/density area. As understood from the foregoing and below, for each type of load/usage/density—low (L), moderate (M), high (H), and very high (VH)—a different subset of radio resources is available for vehicle (V2X) communication.

Figure 12:
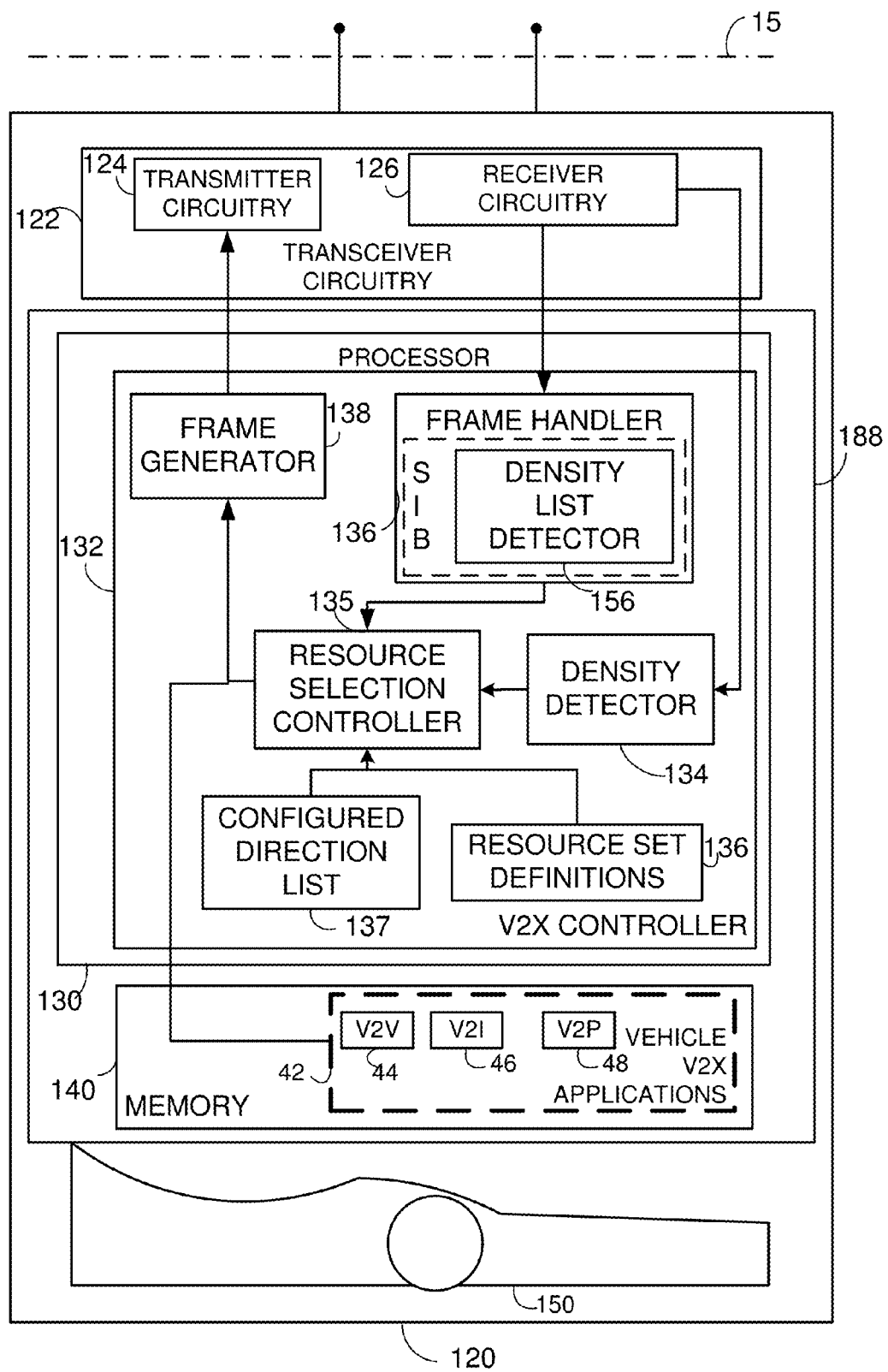
FIG. 12 is a schematic view of an example embodiment of a generic wireless terminal configured to implement a generic density-dependent radio resource selection and utilization for vehicle (V2X) communications.

The discussion herein of the second embodiment, e.g., the density-dependent embodiment, should be understood to encompass and comprise both of the two example conceptualizations of density, with the word "density", "density-dependent", and "density list" being herein utilized to cover and encompass both implementations and conceptualizations FIG. 12 shows various example, representative, non-limiting components and functionalities herein pertinent of a generic wireless terminal 120 configured for density-dependent radio resource allocation for vehicle (V2X) communications. The wireless terminal 120 comprises transceiver circuitry 122, which in turn comprises transmitter circuitry 124 and receiver circuitry 126. The transceiver circuitry 122 includes antenna(e) for the wireless terminal 120. Transmitter circuitry 124 includes, e.g., amplifier(s), modulation circuitry and other conventional transmission equipment. Receiver circuitry 126 comprises, e.g., amplifiers, demodulation circuitry, and other conventional receiver equipment. The transceiver circuitry 122 is configured to use resources allocated for V2X communication, whether those resources be shared with sidelink direct (SLD) communications or separate and distinct for V2X communication as previously described.

The wireless terminal 120 further comprises processor circuitry, also herein known more simply as processor 130. While processor 130 may have responsibility for operation of many aspects of wireless terminal 120 not specifically described herein, in one of its aspects processor 130 serves as a VCX controller 132 for controlling aspects of vehicle (V2X) communication. As further illustrated in FIG. 12, VCX controller 132 in turn comprises frame handler 133, density detector 134; resource selection controller 135; resource set definitions 136, configured density list 137, and frame generator 138.

In addition to the processor circuitry 130, wireless terminal 120 also comprises memory 140 (e.g., memory circuitry) which may store an operating system and various application programs, such as vehicle (V2X) communication applications 44 (including V2I application 46, V2V (vehicle-to-vehicle) application 47 and V2P (vehicle-to-pedestrian) application 48, discussed above. The memory 140 may be any suitable type of memory, e.g., random access memory (RAM), read only memory (ROM), cache memory, processor register memory, or any combination of one or more memory types. The applications such as V2X applications 44 comprise instructions executable by processor circuitry 130 and are stored in non-transient portions of memory 40.

The wireless terminal 120 further comprises user interface(s) 150. The user interfaces 150 may comprise one or more suitable input/output devices which are operable by a user. Some of all of the user interfaces 150 may be realized by a touch sensitive screen. The user interface(s) 50 may also comprise a keyboard, audio input and output, and other user I/O devices. Only a portion of the user interfaces 150 is depicted in FIG. 12, it being understood that the user interfaces 150 may be provided on a cover or case of wireless terminal 50 and thus may visibly obscure the underlying other components shown in FIG. 4.

In the example FIG. 12, the density detector 134 determines density of wireless communication in an area pertinent to the wireless terminal. The pertinent area may be a geographic area in which the wireless terminal 120 currently resides or is travelling, or an area in which the wireless terminal 120 anticipates to reside or travel to in the near future. Density detection may be accomplished in any of several ways, including conventionally known ways. For example, the density detector may gain density information from the node of a cellular radio access network (via either dedicated or broadcast signaling), or from a message from another wireless terminal which informs of a particular level of traffic. Alternatively or additionally, the wireless terminal 120 may itself obtain an indication of the wireless terminal communication density. The wireless terminal 120 may obtain indication of density in various ways, such as (for example) in a passive way as by the driver or passenger of a vehicle observing traffic, and operating on/inputting to appropriate application software (which indicates to lower layers there is a specified level of traffic). Or the wireless terminal 120 may obtain an indication of density in a positive way (e.g., a vehicle UE itself can detect high energy occupation in the resource pools in that area it intends to use, or decode other nearby wireless terminal's scheduling assignments (SAs) to know there are high density wireless terminals nearby).

The processor 130 uses the density information provided by density detector 134 to determine or select a radio resource for use by the wireless terminal for a vehicle (V2X) communication. Such determined or selected radio resource is herein also known as the "selected radio resource". After determination of the selected radio resource, the transceiver circuitry 22 uses the selected radio resource for the vehicle (V2X) communication.

In an example embodiment and mode the processor 130 obtains a density-dependent resource list 154 (see FIG. 13), also known herein as the "density list". The density-dependent resource list 154 may be obtained from a cellular radio access network and/or may be configured at the wireless terminal 120. In terms of network receipt, FIG. 12 shows that frame handler 133 comprises density list detector 156 that obtains and stores the density-dependent resource list 154 as received from the radio access network. As further shown in FIG. 13, the density-dependent resource list 154 may be obtained from a system information block (SIB), such as SIB 58, received in a broadcast from the cellular radio access network. Alternatively or additionally, the density list may be configured (e.g., pre-configured) at processor 30, as represented by configured density list 137 in FIG. 12. The configured density list 137 may be stored or maintained in memory 140 or elsewhere and be available to processor 130.

The density list 154 comprises plural members corresponding to plural pre-defined density values (such as low (L), moderate (M), high (H), and very high (VH) in the example implementations of FIG. 10A-FIG. 10D, and/or FIG. 11A-FIG. 11D, for example). Each of the plural members respectively comprises an identifier of a subset of a set of radio resources. Each of the plural subsets is associated with a corresponding one of plural pre-defined density values.

Figure 13:
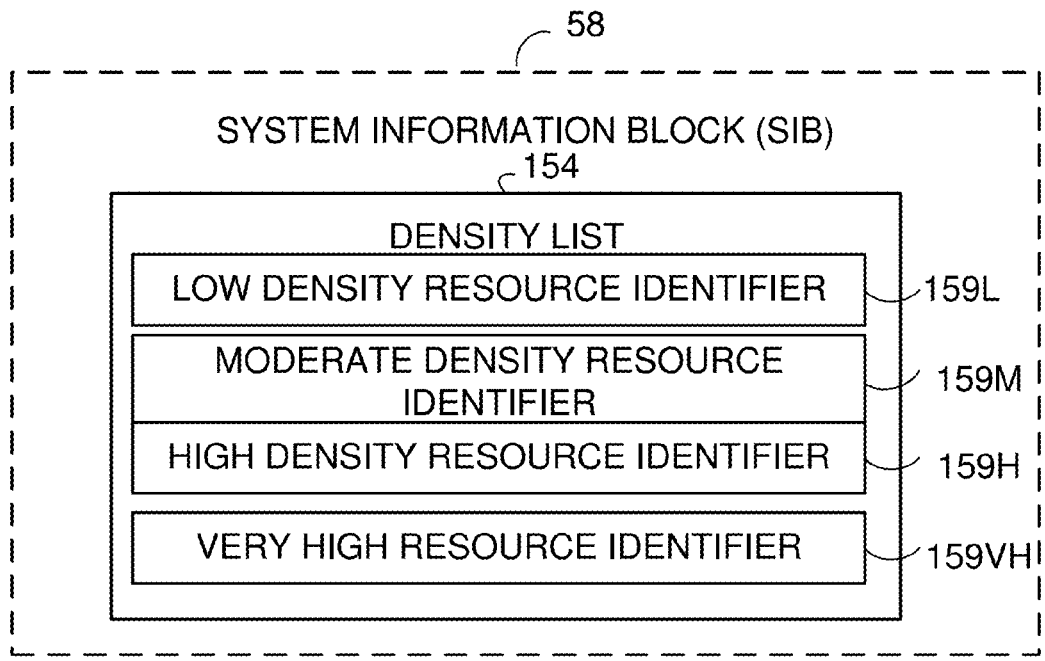
FIG. 13 is a diagrammatic view of a density list for direction-dependent radio resource selection and utilization for vehicle (V2X) communications, and particularly showing an example, non-limiting implementation wherein the density list is in the context of a system information block.

FIG. 13 shows an example density list 154 for a four density value implementation. By way of non-limiting example, the density list 154 is illustrated and described with respect to the four direction example implementation of FIG. 3B. As such, the density list 154 comprises four members: a first member which serves as a low (L) density resource identifier 159L; a second member which serves as a moderate (M) density resource identifier 159M; a third member which serves as a high (H) density resource identifier 159H; and, a fourth member which serves as a very high (VH) density resource identifier 159VH. It should be understood that the number of density values is not limited to four, as two or more density values may be utilized in other implementations. For example, a simplified implementation may utilize two density values ("low" and "high"). Moreover, the members may have names other than "low", "moderate", "high", and "very high". For example, the member names may be "low", "medium", and "high" (for an example three density value implementation).

FIG. 13 happens to show that density list 154 is obtained from a system information block (SIB) 58, but in view of the preceding discussion it should be understood that the density list 154 could alternatively be configured at the wireless terminal and thus stored in configured density list 137.

The radio resource identifiers 159 may take any of several possible forms. For example, the content of a radio resource identifier 159 may itself serve as a listing, definition, or identification of the radio resources comprising the respective subset. Preferably the radio resource identifiers 159 serve as pointers or mapping indicators to the respective subsets of radio resources. For example, the set of radio resources for V2X may be defined or stored in a memory such as resource set definitions 136, and for a given subset the location or whereabouts of the subset in the set is indicated by the corresponding radio resource identifier 159. For example, radio resource identifier 159L may point to a certain memory location or position in an array in resource set definitions 136 which begins a partition of the set of radio resources which are allowed for use when the wireless terminal 120 is in a low density area.

In accordance with the density of wireless communication traffic in the area pertinent to/for the wireless terminal, as determined by density detector 134, the processor 130 consults the member of density list 154 which corresponds to the detected density value, and then uses the corresponding member of density list 154 to identify radio resources which are eligible for selection in view of the direction of travel. From the eligible radio resources, the processor resource selection controller 135 selects the "selected" radio resource for use in the vehicle (V2X) communication.

Figure 14A:
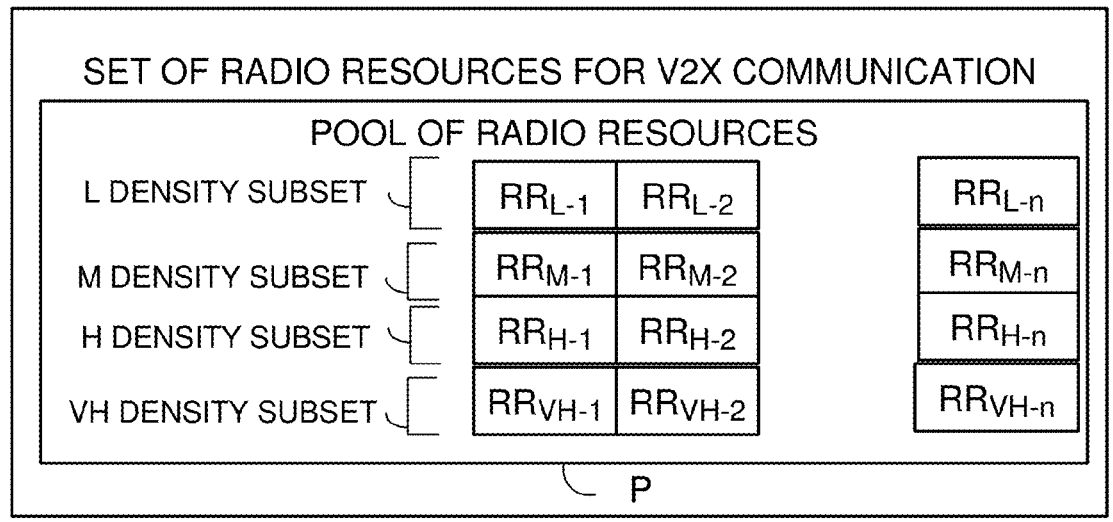
FIG. 14A is a diagrammatic view of a set of radio resource, and particularly showing the set as comprising a pool of radio resources, with different subsets of the pool being allocated to corresponding different density values.

As mentioned above, the set of radio resources may comprise one or more pools. In a situation illustrated in FIG. 14A, the set of radio resource comprises one pool P. The pool P in turn comprises several subsets, an in particular in view of the density-dependent subset classification hereof includes a subset for each of plural predetermined density values or levels. For example, the pool P of FIG. 14A comprises a first subset (low density subset) which in turn comprises radio resources $RR_{L-1}$ through $RR_{L-m}$; a second subset (moderate density subset) which in turn comprises radio resources $RR_{M-1}$ through $RR_{M-n}$; a third subset (high density subset) which in turn comprises radio resources $RR_{H-1}$ through $RR_{H-m}$; and a fourth subset (very high density subset) which in turn comprises radio resources $RR_{VH-1}$ through $RR_{VH-m}$. It should be understood that, in an example implementation, the respective radio resource identifiers 59L, 59M, 59H, and 59VH may respectively point to the memory locations for the corresponding density subsets.

Figure 14B:
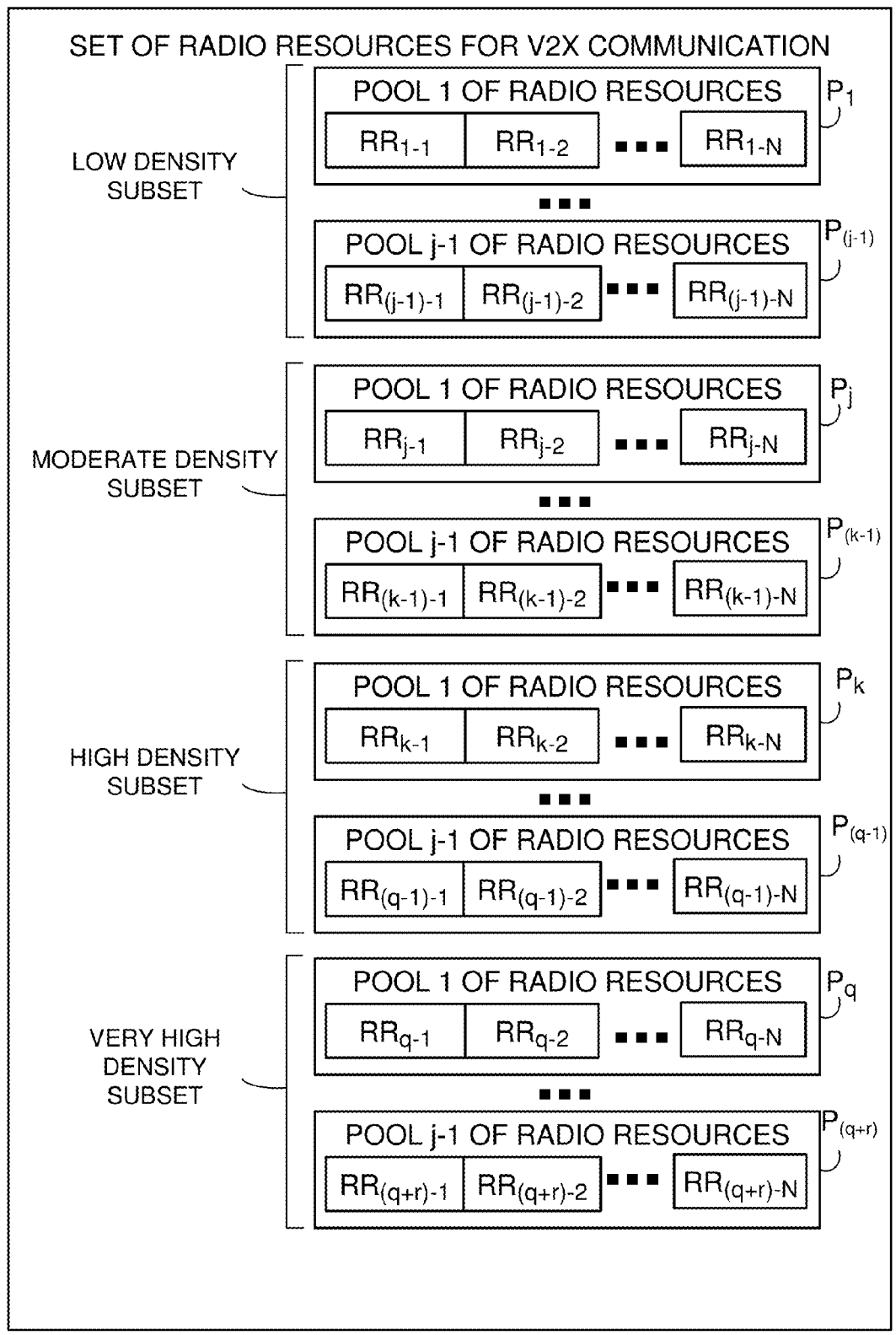
FIG. 14B is a diagrammatic view of a set of radio resource, and particularly showing the set as comprising a plural pools of radio resources, with different subsets of the plural pools being allocated to corresponding different density values.

In a situation illustrated in FIG. 14B, the set of radio resource comprises plural pools P . . . $P_{(q+r)}$, with each subset comprising one or more pools. In the non-limiting example implementation of FIG. 14B, a first subset of radio resources (low density subset) comprises pools $P_1$ through $P_{j-1}$; a second subset of radio resources (moderate density subset) comprises pools $P_j$ through $P_{k-1}$ a third subset or radio resources (high density subset) comprises pools $P_k$ through $P_{q-1}$; and a fourth subset or radio resources (very high density subset) comprises pools $P_q$ through $P_{q+r}$. Each pool comprises plural radio resources.

Figure 15:
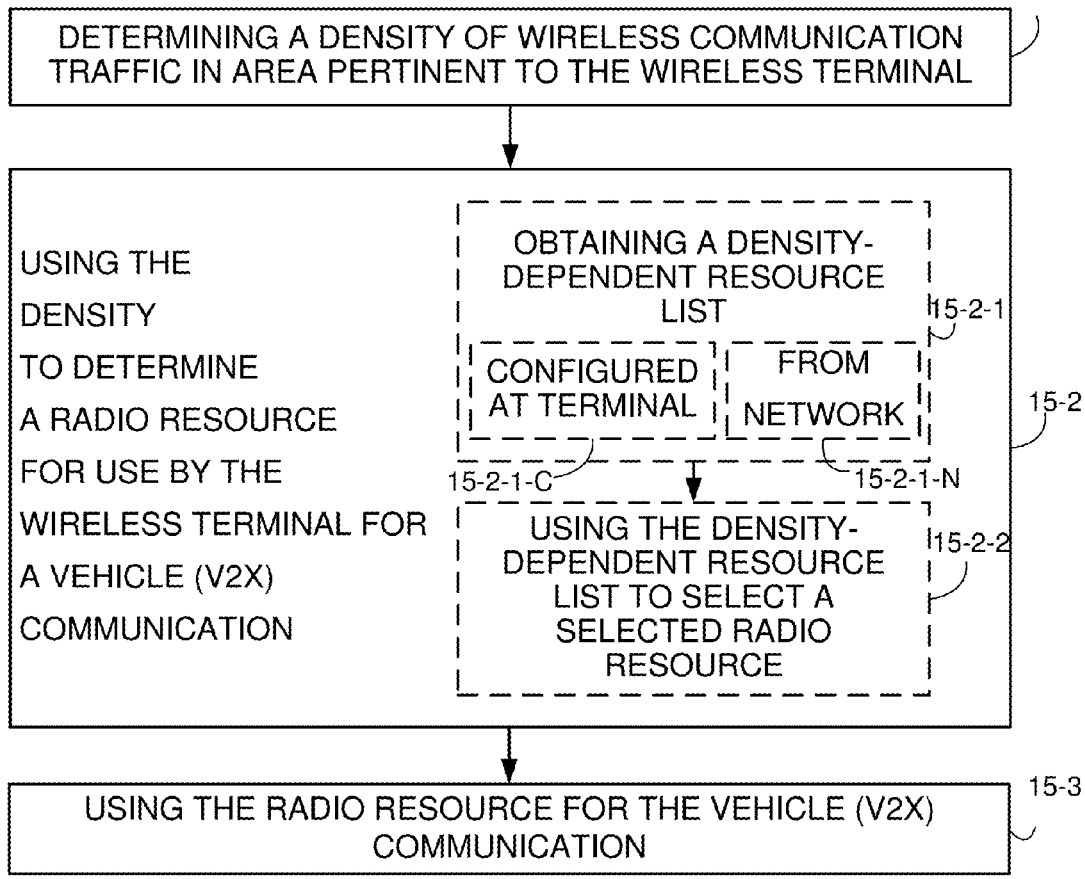
FIG. 15 is a flowchart depicting basic, example acts or steps involved in generic method of operating a wireless terminal configured to implement a generic density-dependent radio resource selection and utilization for vehicle (V2X) communications.

FIG. 15 is a flowchart depicting basic, example acts or steps involved in generic method of operating the generic wireless terminal 120 of FIG. 12. Act 15-1 comprises determining a density of wireless communication traffic (density indication) in an area pertinent to the direction/orientation of travel of the wireless terminal 120. Act 15-2 comprises using the density indication to determine a radio resource for use by the wireless terminal for a vehicle (V2X) communication. Act 15-3 comprises using the radio resource for the vehicle (V2X) communication.

As understood from the preceding discussion, in a non-limiting example embodiment and mode act 15-2 may in turn comprise act 15-2-1 and act 15-2-2. Act 15-2-1 comprises obtaining a density-dependent resource list. As explained above, the density-dependent resource list comprises plural members corresponding to plural pre-defined density values, each of the plural members respectively comprising an identifier of a subset of a set of radio resources, each of plural subsets being associated with a corresponding one of plural pre-defined density values. The density list 154 may be obtained from a cellular radio access network (as indicated by act 15-2-1-N), or be configured at the wireless terminal (as indicated by act 15-2-1-C). Act 15-2-2 comprises in accordance with the density of the wireless communications, using the density-dependent resource list to select a selected radio resource.

In an example, non-limiting variation, the resource selection controller 135 may be further configured to select the selected radio resource in dependence on an additional allocation criteria other than wireless communication density. For example, the resource selection controller 135 may be programmed not only to use wireless communication density as a determining factor for selection of the selected radio resource, but another allocation factor as well. One example of such other allocation factors or allocation criteria may include geographical area mapping (in which the set is subdivided or partitioned into geographical regions). Another example allocation factor or criteria may be service type, e.g., whether the V2X service is V2V, V2I, or V2P, for example. Another example allocation factor or criteria may be nature of event triggering the vehicle (V2X) communication. For example, one triggering event may be an emergency, another triggering event may be non-emergency. Another example allocation factor or criteria may be priority (e.g., priority afforded to a wireless terminal or to a particular service, for example). Moreover, as illustrated further herein, another example allocation factor or criteria may be direction of travel.

Figure 14C:
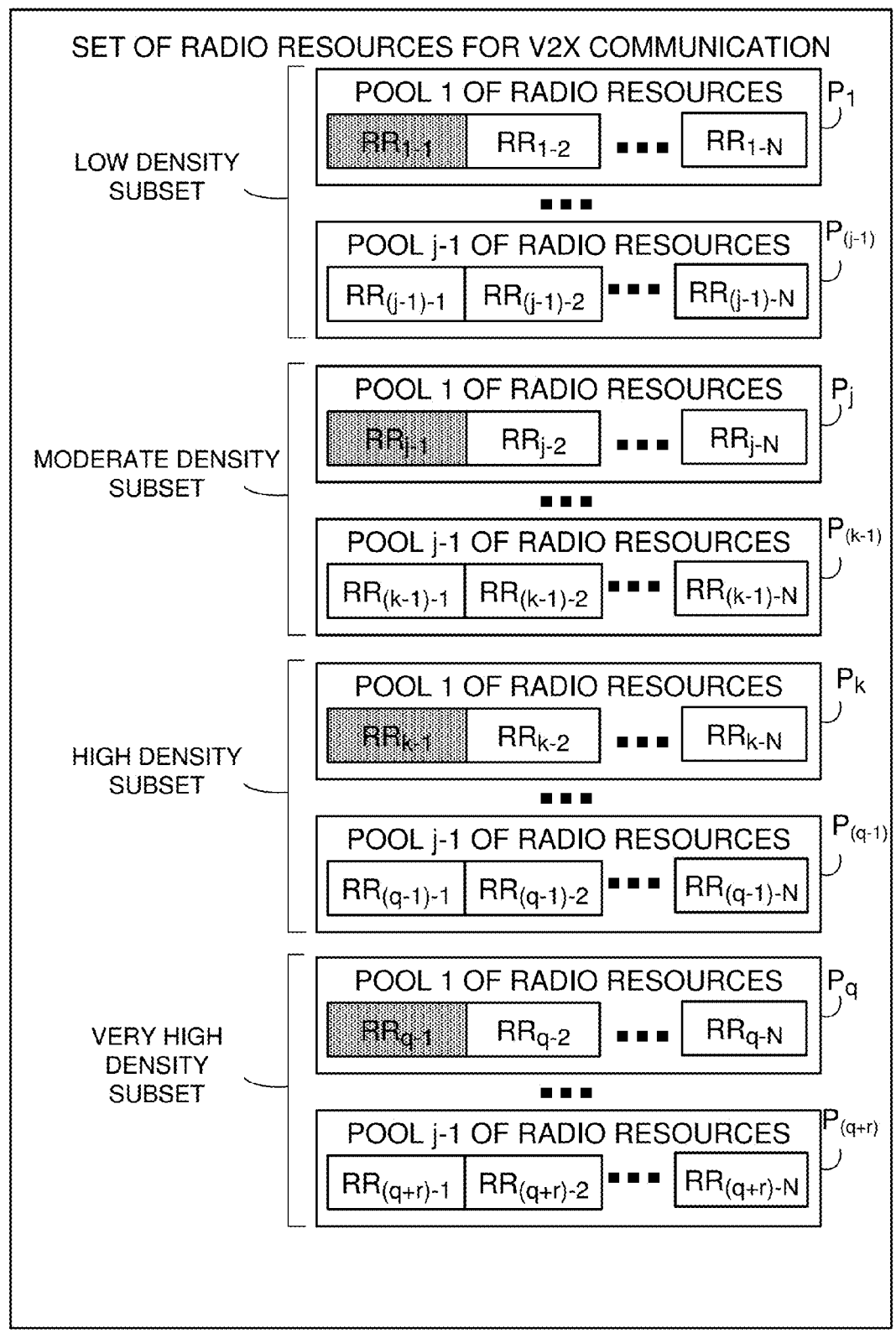
FIG. 14C is a diagrammatic view of a set of radio resource, and particularly showing the set as comprising a plural pools of radio resources, with different subsets of the plural pools being allocated to corresponding different density values and also showing radio resource allocation according to other example allocation criteria.

In view of the foregoing, FIG. 14C shows a non-limiting implementation wherein the set of radio resources comprises plural pools in the manner of FIG. 14B, with each of the density levels or values L, M, H, and VH having an associated subset of resources (each subset comprising one or more pools). But FIG. 14C further shows how resource selection controller 135 may be constrained to select a radio resource not only on the basis of density, but some other allocation criteria or factor as well. For example, the wireless terminal 120 is travelling in an east bound direction, and if the resource selection controller 135 is directed in such situation to use radio resources specially allocated or reserved for east bound direction (in the manner of the first example embodiment), the resource selection controller 135 may be restrained to use one of the radio resources shown with stippled interior in FIG. 14C (e.g., one of radio resources $RR_{1-1}$, $RR_{j-1}$, $RR_{k-1}$, or $RR_{q-1}$. Thus, for example, if the wireless terminal were in a low density area and traveling eastbound, the resource selection controller 35 would choose radio resource $RR_{1-1}$ from the first (low density) subset of radio resources. Furthermore, resource selection controller 135 may utilize more than two allocation factors or criteria, as indicated by other radio resources of FIG. 14C which have internal vertical striping.

Figure 16:
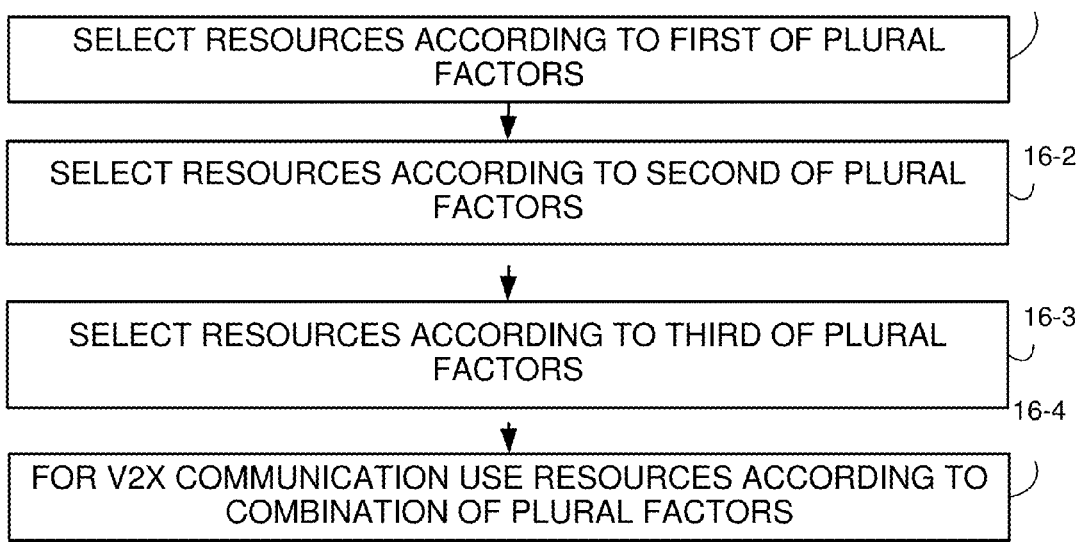
FIG. 16 is a flowchart depicting basic, example acts or steps involved in generic method of operating a wireless terminal configured to implement plural allocation criteria in order to select an appropriate subset of radio resources.

FIG. 16 shows operation of an example wireless terminal which uses plural allocation criteria in order to select an appropriate subset of radio resources. The appropriate subset may be the common elements of plural subsets associated with the plural allocation criteria. In the situation shown in FIG. 16 the wireless terminal may have already received the plural allocation criteria, e.g., plural resource list such as, for example, a first resource list which may be priority-dependent, a second resource list which may be direction-dependent, and a third resource list which may be density-dependent, for example. Act 16-1 comprises processor circuitry of the wireless terminal selecting radio resources according to a first of plural criteria, (e.g., according to the first resource allocation criteria or factor, e.g., in accordance with a first resource list); act 16-2 comprises the processor circuitry of the wireless terminal then selecting radio resources according to a second of plural criteria (e.g., according to the second resource allocation criteria or factor, e.g., in accordance with a second resource list); and act 16-3 comprises the processor circuitry of the wireless terminal then selecting radio resources according to a third of plural criteria (e.g., according to the third resource allocation criteria or factor, e.g., in accordance with a third resource list). In an example implementation, the selection of act 16-2 is made with respect to the resources selected after act 16-1, and the selection of act 16-3 is made with respect to the resultant resources selected after act 16-2. Alternatively, after separate performance of each of act 16-1 through act 16-2, the ultimately selection may be made from the common members of the three subsets resulting from all three acts. Any number of resource/criteria lists may be utilized, e.g., two or more resource lists. Of course, the particular allocation criteria discussed above and the number of criteria or factors are not critical, since the factors mentioned above are merely exemplary. Act 16-4 comprises the wireless terminal using, for V2X communication, a radio resource selected according to a combination of the plural factors or criteria.

It was just mentioned above that the wireless terminal may have already received the plural allocation criteria, e.g., plural resource list such as, for example, a first resource list which may be priority-dependent, a second resource list which may be direction-dependent, and a third resource list which may be density-dependent, for example. It has already been discussed that one allocation criteria may be geographical area mapping (in which the set is subdivided or partitioned into geographical regions). Thus a wireless terminal may use geographical region as an allocation criteria.

It has also been explained herein that allocation criteria may be configured at the wireless terminal, and thus stored in memory circuitry. It has been mentioned above that one type of configuration may be pre-configuration. It has also been explained herein that a wireless terminal may receive allocation criteria in system information such as a system information block (SIB) structured in accordance with the allocation criteria.

As shown in various illustrations and described herein, the allocation criteria may be associated with resource pools. Thus, as it is understood from the description herein that the technology disclosed herein encompasses a wireless terminal comprising memory circuitry, detection circuitry, and selection controlling circuitry. The memory circuitry is configured to store first information specifying multiple geographical regions and second information multiple resource pools. The detecting circuitry is configured to detect a current geographical region. The selection controlling circuitry is configured to select a resource pool from the multiple resource pools based on the geographical region. In an example embodiment and mode, the first information and the second information are pre-configured in the memory circuitry. In another example embodiment and mode, the wireless terminal further comprises controlling circuitry configured to receive a system information block (SIB) which carries the first information and the second information. A corresponding method of operating the wireless terminal is also understood from the description herein.

From the preceding discussion it is also evident that a system information block (SIB) may have plural members and the resource pools may be multi-dimensional, which means that members of the SIB and/or resource pools have identifiers or indices for distinguishing among the members. Thus, as it is understood from the description herein that the technology disclosed herein encompasses a wireless terminal wherein each of the multiple geographical regions has its own first index; each of the multiple resource pools having its own second index, the detecting circuitry is further configured to determine a first index which corresponds to the current geographical region; and the resource pool selected by the selection controlling circuitry is a resource pool having the second index equal to the determined first index. A corresponding method of operating the wireless terminal is also understood from the description herein.

In view of the fact that the resource allocation criteria may be configured at the wireless terminal, it is also understood from the description herein that that the technology disclosed herein encompasses a wireless terminal comprising memory circuitry, detection circuitry, and selection controlling circuitry. The memory circuitry is configured to store first information specifying multiple geographical regions and second information specifying multiple resource pools, each of the multiple geographical regions having its own first index, each of the multiple resource pools having its own second index. The detecting circuitry is configured to detect a current geographical region and determine a first index which corresponds to the current geographical region. The selection controlling circuitry is configured to select a resource pool from the multiple resource pools, wherein selected resource pool is a resource pool having the second index equal to the determined first index. A corresponding method of operating the wireless terminal is also understood from the description herein.

Figure 17:
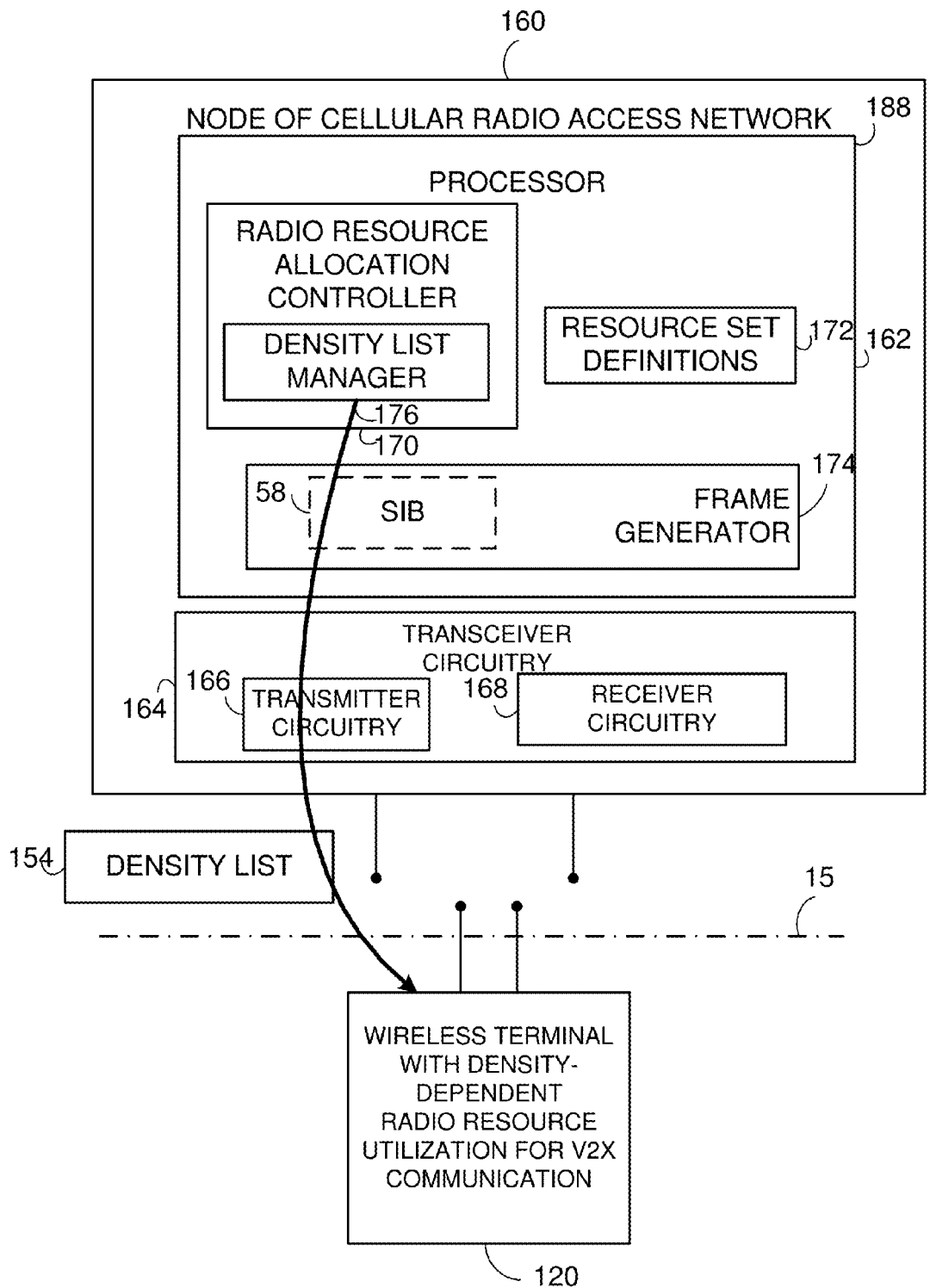
FIG. 17 is a schematic view of an example node of a cellular radio access network configured to facilitate implementation of density-dependent radio resource selection and utilization for vehicle (V2X) communications.

FIG. 17 illustrates node 160 of a cellular radio access network which facilitates use by the wireless terminal 120 of density-dependent radio resource selection. The node 160 may be a base station node, such as an eNodeB (e.g., eNB) for example. The node 160 comprises processor circuitry 162 and transceiver circuitry 164. The transceiver circuitry 164 in turn comprises transmitter circuitry 166 and receiver circuitry 168. The processor circuitry 162 comprises radio resource allocation controller 170, resource set definitions 172, and frame generator 174. FIG. 17 further shows that radio resource allocation controller 170 comprises density list manager 176, and that the frame generator 174 generates system information block (SIB) 58.

Figure 18:
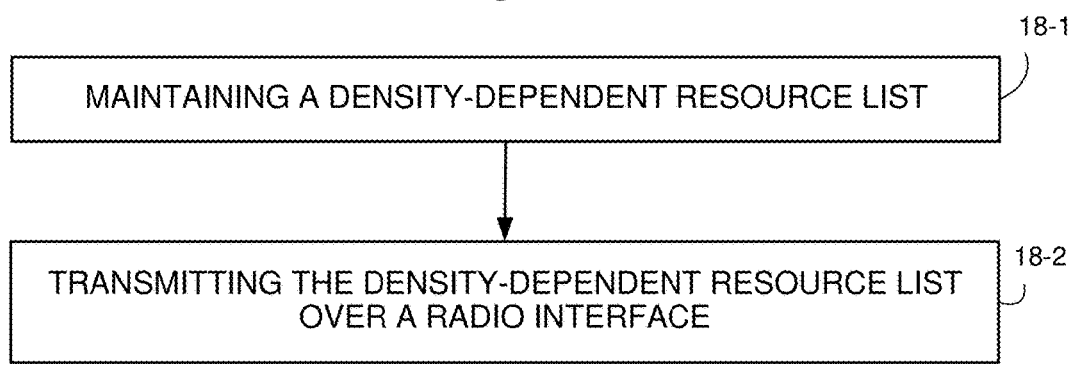
FIG. 18 is a flowchart depicting basic, example acts or steps involved in generic method of operating a node of a cellular radio access network in facilitating implementation of a density-dependent radio resource selection and utilization for vehicle (V2X) communications.

FIG. 18 shows example, representative, non-limiting acts or steps performed by the node 160 of FIG. 17. Act 18-1 comprises the radio resource allocation controller 70, and density list manager 176 in particular, maintaining the density-dependent resource list 154. As explained above with example reference to FIG. 13, the density-dependent resource list 154 comprises plural members corresponding to plural pre-defined density values or levels in an area pertinent to wireless terminal, each of the plural members respectively comprising an identifier of a subset of a set of radio resources for use in vehicle (V2X) communication, each of plural subsets being associated with a corresponding one of plural pre-defined density values. Act 18-2 comprises transmitter circuitry 66 transmitting the density-dependent resource list 154 over a radio interface, e.g., to the wireless terminal. The density-dependent resource list 154 may be broadcasted by the node to the wireless terminal, or signaled by the node to the wireless terminal through dedicated signaling. When transmission is between the node and the wireless terminal, the air interface over which the density-dependent resource list 154 is transmitted is the legacy Uu interface. In an example embodiment and mode, the density list 154 is transmitted in a radio frame or subframe, and in an example implementation the density list 154 is included in a system information block (SIB) 58.

Thus, in the second example embodiment the traffic load (UE density) is a factor affecting resource selection, since more wireless terminals concentrating in one area require more resources for communications. Therefore, the wireless terminal can transmit with pools which can meet wireless terminal's traffic load situation.

Either one of the above two factors—direction of travel and wireless communication density—may affect resource selection, or the combination of two affect resource selection together (partitioning based on partition). Each of them can be applied in one, or two, or all three resource allocation methods.

As mentioned above, there are also other factors, such as the legacy priority; the service type, whether it is V2V, V2P or V2I; and communication traffic type, whether it is event triggered communication (due to some accident), or periodic communication (i.e., periodically broadcast UE's information such as velocity and location). These can also be implemented with the above resources/resource pools partition method.

Nothing herein or in the drawings is intended to limit how radio resources are defined or structured. Nor is discussion of partitioning of pools or radio resources intended to be limited to any partitioning technique since, e.g., pools may be partitioned in frequency domain or in time domain, or with a combination of time domain and frequency domain. In this respect, no axis or depiction of pool or resource placement in any of the drawings necessarily imparts a sense of time or frequency domain, but merely the fact that a set of resources may be partitioned into subsets.

One or both of the direction-dependent radio resource allocation and the density-dependent radio resource allocation described above can be utilized in conjunction with existing 3GPP technology. For example, the direction list 54 and the density list 154 may be included in 3GPP technology in a similar manner as an existing information element (IE) known as "priorityList". A possible name for such a new information element for direction list 54 may be "direction-List"; a possible name for such a new information element for density list 154 may be "densityList". The particular name of the list is not critical, since other names may instead be utilized. Table 1 below provides an example algorithm for use of the direction list 54 and density list 154, both being generically represented by the identifier "dList". Alternatively, "dList" may represent a result of or situation of combined allocation criteria or allocation factor. For example, factors affecting resource selection such as direction and priority may be combined: the "dList" may be the list after "direction" and "priority" filtering. Moreover, there may be a geo-map which indicating which area will use which resource pool/pools. So within the pool(s) in that area, the wireless terminal can transmit further in pools indicated by "directionList" or "densityList".

TABLE 1

A UE capable of V2X communication that is configured by upper layers to transmit sidelink communication and has related data to be transmitted or a UE capable of relay related sidelink communication that is configured by upper layers to transmit relay related sidelink communications shall:
1> if the conditions for sidelink operation as defined in 5.10.1a are met:
    2> if in coverage on the frequency used for sidelink communication, as defined in TS 36.304 [4, 11.4]:
        3> if the UE is in RRC_CONNECTED and uses the PCell for sidelink communication:

TABLE 1-continued

```
        4> if the UE is configured, by the current PCell/ the PCell in which
   physical layer problems or radio link failure was detected, with
   commTxResources set to scheduled:
            5> if T310 or T311 is running; and if the PCell at which the
        UE detected physical layer problems or radio link failure
        broadcasts SystemInformationBlockType18 including
        commTxPoolExceptional; or
            5> if T301 is running and the cell on which the UE initiated
        connection re-establishment broadcasts
        SystemInformationBlockType18 including
        commTxPoolExceptional:
                6> configure lower layers to transmit the sidelink
            control information and the corresponding data using the
            pool of resources indicated by the first entry in
            commTxPoolExceptional;
            5> else:
                6> configure lower layers to request E-UTRAN
            to assign transmission resources for sidelink
            communication;
        4> else if the UE is configured with
    commTxPoolNormalDedicated:
            5> if dList is included for the entries of
        commTxPoolNormalDedicated:
                6> configure lower layers to transmit the sidelink
            control information and the corresponding data using the
            one or more pools of resources indicated by
            commTxPoolNormalDedicated i.e. indicate all entries of
            this field to lower layers;
            5> else:
                6> configure lower layers to transmit the sidelink
            control information and the corresponding data using the
            pool of resources indicated by the first entry in
            commTxPoolNormalDedicated;
    3> else (i.e. sidelink communication in RRC_IDLE or on cell other than
PCell in RRC_CONNECTED):
        4> if the cell chosen for sidelink communication transmission
    broadcasts SystemInformationBlockType18:
            5> if SystemInformationBlockType18 includes
        commTxPoolNormalCommon:
                6> if dList is included for the entries of
            commTxPoolNormalCommon:
                    7> configure lower layers to transmit the
                sidelink control information and the corresponding
                data using the one or more pools of resources
                indicated by commTxPoolNormalCommon i.e.
                indicate all entries of this field to lower layers;
                6> else:
                    7> configure lower layers to transmit the
                sidelink control information and the corresponding
                data using the pool of resources indicated by the first
                entry in commTxPoolNormalCommon;
            5> else if SystemInformationBlockType18 includes
        commTxPoolExceptional:
                6> from the moment the UE initiates connection
            establishment until receiving an
            RRCConnectionReconfiguration including sl-CommConfig
            or until receiving an RRCConnectionRelease or an
            RRCConnectionReject;
                7> configure lower layers to transmit the
                sidelink control information and the corresponding
                data using the pool of resources indicated by the first
                entry in commTxPoolExceptional;
2> else (i.e. out of coverage on sidelink carrier):
    3> if dList is included for the entries of preconfigComm in SL-
Preconfiguration defined in 9.3:
        4> configure lower layers to transmit the sidelink control
    information and the corresponding data using the one or more pools of
    resources indicated preconfigComm i.e. indicate all entries of this field to
    lower layers and in accordance with the timing of the selected SyncRef
    UE, or if the UE does not have a selected SyncRef UE, based on the UEs
    own timing;
    3> else:
        4> configure lower layers to transmit the sidelink control
    information and the corresponding data using the pool of resources that
    were preconfigured i.e. indicated by the first entry in preconfigComm in
    SL-Preconfiguration defined in 9.3 and in accordance with the timing of
    the selected SyncRef UE, or if the UE does not have a selected SyncRef
    UE, based on the UEs own timing;
```

Figure 19:
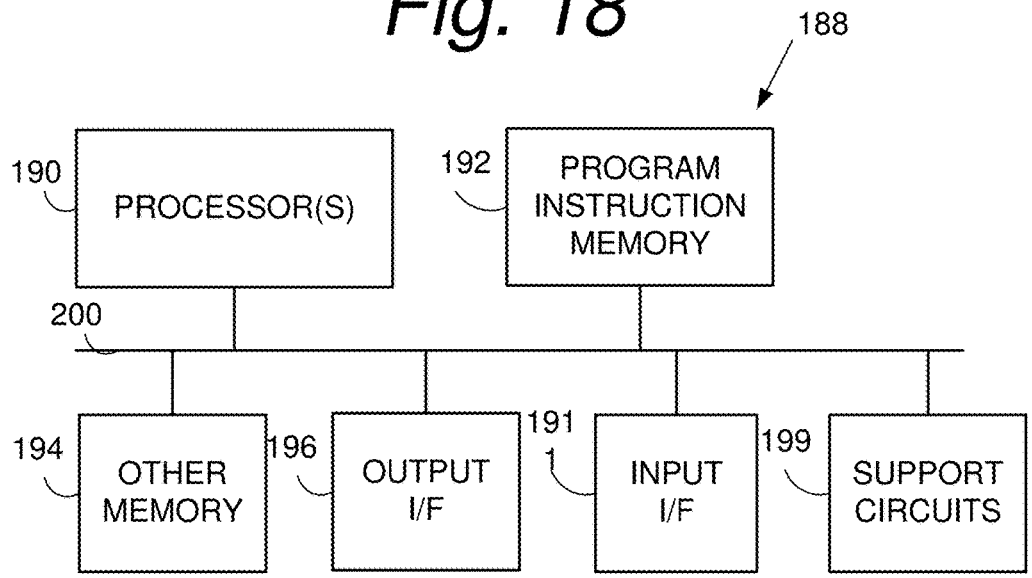
FIG. 19 is a diagrammatic view showing example elements comprising electronic machinery which may comprise a wireless terminal according to an example embodiment and mode.

Certain units and functionalities of wireless terminal 40 framed by broken line are, in an example embodiment, implemented by terminal electronic machinery 88. FIG. 19 shows an example of such electronic machinery 188 as comprising one or more processors 190, program instruction memory 192; other memory 194 (e.g., RAM, cache, etc.); input/output interfaces 196; peripheral interfaces 198; support circuits 199; and busses 200 for communication between the aforementioned units. The processor(s) 190 may comprise the processor circuitries described herein, for example.

The memory 194, or computer-readable medium, may be one or more of readily available memory such as random access memory (RAM), read only memory (ROM), floppy disk, hard disk, flash memory or any other form of digital storage, local or remote, and is preferably of non-volatile nature, as and such may comprise memory 40 shown in FIG. 4 or memory 140 shown in FIG. 12. The support circuits 199 are coupled to the processors 190 for supporting the processor in a conventional manner. These circuits include cache, power supplies, clock circuits, input/output circuitry and subsystems, and the like.

Although the processes and methods of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routines of the disclosed embodiments are capable of being executed on any computer operating system, and is capable of being performed using any CPU architecture.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" may also be construed to refer to other hardware capable of performing such functions and/or executing software, such as the example hardware recited above.

Nodes that communicate using the air interface also have suitable radio communications circuitry. Moreover, the technology disclosed herein may additionally be considered to be embodied entirely within any form of computer-readable memory, such as solid-state memory, magnetic disk, or optical disk containing an appropriate set of computer instructions that would cause a processor to carry out the techniques described herein.

Moreover, each functional block or various features of the wireless terminal 40 used in each of the aforementioned embodiments may be implemented or executed by circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It will be appreciated that the technology disclosed herein is directed to solving radio communications-centric issues and is necessarily rooted in computer technology and overcomes problems specifically arising in radio communications. Moreover, the technology disclosed herein improves basic function of a wireless terminal and a base station, so that, for example, operation of these entities may occur more effectively by prudent use of radio resources.

Thus, from the foregoing it is understood that the technology disclosed herein has various aspects. In one of its aspects the technology disclosed herein concerns a wireless terminal configured for use in vehicle (V2X) communications. The wireless terminal comprises a detector and processor circuitry. The detector is configured to determine a direction/orientation of travel of the wireless terminal. The processor circuitry is configured to use the direction of travel to determine a radio resource for use by the wireless terminal for a vehicle (V2X) communication; and In an example embodiment and mode the wireless terminal further comprises transceiver circuitry configured to use the radio resource for the vehicle (V2X) communication.

In an example embodiment and mode the processor circuitry is further configured to obtain a direction-dependent resource list, the direction-dependent resource list comprising plural members corresponding to plural pre-defined directions, each of the plural members respectively comprising an identifier/pointer/mapper/definition of a subset of a set of radio resources, each of plural subsets being associated with a corresponding one of plural pre-defined directions; and, in accordance with the direction of travel of the wireless terminal, use the direction-dependent resource list to select a selected radio resource.

In an example embodiment and mode the processor circuitry is further configured to obtain the direction-dependent resource list from a cellular radio access network.

In an example embodiment and mode the processor circuitry is further configured to obtain the direction-dependent resource list from a system information block broadcast by the cellular radio access network.

In an example embodiment and mode the wireless terminal further comprises memory circuitry, and wherein the processor circuitry is configured to obtain the direction-dependent resource list from the memory circuitry in view of the direction-dependent resource list being configured at the wireless terminal.

In an example embodiment and mode the plural pre-defined directions comprise compass directions of north, west, south, and east.

In an example embodiment and mode the subset of radio resources comprises one or more pools of radio resources.

In an example embodiment and mode the processor circuitry is further configured to select the selected radio resource in dependence on an additional allocation criteria other than direction of travel.

In another of its aspects the technology disclosed herein concerns a method of operating a wireless terminal configured for use in vehicle (V2X) communications. In a basic mode the method comprises: determining a direction/orientation of travel of the wireless terminal; processor circuitry using the direction of travel to determine a radio resource for use by the wireless terminal for a vehicle (V2X) communication; and using the radio resource for the vehicle (V2X) communication.

In an example embodiment and mode the method further comprises the processor circuitry obtaining a direction-dependent resource list, the direction-dependent resource list comprising plural members corresponding to plural pre-defined directions, each of the plural members respectively comprising an identifier/pointer/mapper/definition of a subset of a set of radio resources, each of plural subsets being associated with a corresponding one of plural pre-defined directions; and the processor circuitry, in accordance with the direction of travel of the wireless terminal, using the direction-dependent resource list to select a selected radio resource.

In an example embodiment and mode the method further comprises the processor circuitry obtaining the direction-dependent resource list from a cellular radio access network.

In an example embodiment and mode the method further comprises the processor circuitry obtaining the direction-dependent resource list from a system information block broadcast by the cellular radio access network.

In an example embodiment and mode the method further comprises the processor circuitry obtaining the direction-dependent resource list from a memory circuitry of the wireless terminal in view of the direction-dependent resource list being configured at the wireless terminal.

In an example embodiment and mode wherein the plural pre-defined directions comprise compass directions of north, west, south, and east.

In an example embodiment and mode the subset of radio resources comprises one or more pools of radio resources.

In an example embodiment and mode the method further comprises the processor circuitry selecting the selected radio resource in dependence on an additional allocation criteria other than direction of travel.

In another of its aspects the technology disclosed herein concerns a node of a cellular radio access network. In a basic embodiment and mode node comprises processor circuitry and transmitter circuitry. The processor circuitry is configured to maintain a direction-dependent resource list, the direction-dependent resource list comprising plural members corresponding to plural pre-defined directions of potential travel of a wireless terminal in coverage of the cellular radio access network, each of the plural members respectively comprising an identifier/pointer/mapper/definition of a subset of a set of radio resources for use in vehicle (V2X) communication, each of plural subsets being associated with a corresponding one of plural pre-defined directions. The transmitter circuitry is configured to transmit the direction-dependent resource list over a radio interface.

In an example embodiment and mode the processor circuitry is configured to include the direction-dependent resource list in a system information block broadcast by the cellular radio access network.

In an example embodiment and mode the plural pre-defined directions comprise compass directions of north, west, south, and east.

In an example embodiment and mode the subset of radio resources comprises one or more pools of radio resources.

In an example embodiment and mode each of plural subsets is also associated with an additional allocation criteria other than direction of travel.

In another of its aspects the technology disclosed herein concerns a method in a node of network of a cellular radio access network. The method comprises using processor circuitry to maintain a direction-dependent resource list, the direction-dependent resource list comprising plural members corresponding to plural pre-defined directions of potential travel of a wireless terminal in coverage of the cellular radio access network, each of the plural members respectively comprising an identifier/pointer/mapper/definition of a subset of a set of radio resources for use in vehicle (V2X) communication, each of plural subsets being associated with a corresponding one of plural pre-defined directions; and transmitting the direction-dependent resource list over a radio interface.

In an example embodiment and mode the method further comprises the processor circuitry including the direction-dependent resource list in a system information block broadcast by the cellular radio access network.

In an example embodiment and mode the plural pre-defined directions comprise compass directions of north, west, south, and east.

In an example embodiment and mode the subset of radio resources comprises one or more pools of radio resources.

In an example embodiment and mode each of plural subsets is also associated with an additional allocation criteria other than direction of travel.

In another of its aspects the technology disclosed herein concerns a wireless terminal configured for use in vehicle (V2X) communications. The wireless terminal comprises a detector; processor circuitry; and transceiver circuitry. The detector is configured to determine a density indicator which expresses density of wireless communication in an area pertinent to the wireless terminal. The processor circuitry is configured to use the density indicator to determine a radio resource for use by the wireless terminal for a vehicle (V2X) communication. The transceiver circuitry is configured to use the radio resource for the vehicle (V2X) communication.

In an example embodiment and mode the density indicator expresses density of wireless communication in terms of load on or extent of use of radio resources in the pertinent area.

In an example embodiment and mode the density indicator expresses density of wireless communication in terms of a number of wireless terminals participating in wireless communications in the pertinent area.

In an example embodiment and mode the processor circuitry is configured to obtain a density-dependent resource list, the density-dependent resource list comprising plural members corresponding to plural pre-defined density values, each of the plural members respectively comprising an identifier/pointer/mapper/definition of a subset of a set of radio resources, each of plural subsets being associated with a corresponding one of plural pre-defined density values; in accordance with the density of travel of the wireless terminal, use the density-dependent resource list to select a selected radio resource.

In an example embodiment and mode the processor circuitry is configured to obtain the density-dependent resource list from a cellular radio access network.

In an example embodiment and mode the processor circuitry is configured to obtain the density-dependent resource list from a system information block broadcast by the cellular radio access network.

In an example embodiment and mode the wireless terminal further comprises memory circuitry, and wherein the processor circuitry is configured to obtain the density-dependent resource list from the memory circuitry in view of the density-dependent resource list being configured at the wireless terminal.

In an example embodiment and mode the plural pre-defined density values comprise density values of low density, moderate density, heavy density, and very heavy density.

In an example embodiment and mode subset of radio resources comprises one or more pools of radio resources.

In an example embodiment and mode the processor circuitry is further configured to select the selected radio resource in dependence on an additional allocation criteria other than density.

In another of its aspects the technology disclosed herein concerns method of operating a wireless terminal configured for use in vehicle (V2X) communications. IN a basic mode the method comprise: determining a density indicator which expresses density of wireless communication in an area pertinent to the wireless terminal; processor circuitry using the density indicator to determine a radio resource for use by the wireless terminal for a vehicle (V2X) communication; and using the radio resource for the vehicle (V2X) communication.

In an example embodiment and mode the density indicator expresses density of wireless communication in terms of load on or extent of use of radio resources in the pertinent area.

In an example embodiment and mode the density indicator expresses density of wireless communication in terms of a number of wireless terminals participating in wireless communications in the pertinent area.

In an example embodiment and mode the method further comprises: the processor circuitry obtaining a density-dependent resource list, the density-dependent resource list comprising plural members corresponding to plural pre-defined density values, each of the plural members respectively comprising an identifier of a subset of a set of radio resources, each of plural subsets being associated with a corresponding one of plural pre-defined density values; the processor circuitry, in accordance with the density indicator, using the density-dependent resource list to select a selected radio resource.

In an example embodiment and mode the method further comprises the processor circuitry obtaining the density-dependent resource list from a cellular radio access network.

In an example embodiment and mode the method further comprises the processor circuitry obtaining the density-dependent resource list from a system information block broadcast by the cellular radio access network.

In an example embodiment and mode the method further comprises the processor circuitry obtaining the density-dependent resource list from a memory circuitry of the wireless terminal in view of the density-dependent resource list being configured at the wireless terminal.

In an example embodiment and mode the plural pre-defined density values comprise density values of low density, moderate density, high density, and very high density.

In an example embodiment and mode the subset of radio resources comprises one or more pools of radio resources.

In an example embodiment and mode the method further comprises the processor circuitry selecting the selected radio resource in dependence on an additional allocation criteria other than density.

In another of its aspects the technology disclosed herein concerns a node of a cellular radio access network. The node comprises processor circuitry and transmitter circuitry. The processor circuitry is configured to maintain a density-dependent resource list, the density-dependent resource list comprising plural members corresponding to plural pre-defined density values of wireless communication in an area pertinent to a wireless terminal, each of the plural members respectively comprising an identifier of a subset of a set of radio resources for use in vehicle (V2X) communication, each of plural subsets being associated with a corresponding one of plural pre-defined density values. The transmitter circuitry is configured to transmit the density-dependent resource list over a radio interface.

In an example embodiment and mode the density indicator expresses density of wireless communication in terms of load on or extent of use of radio resources in the pertinent area.

In an example embodiment and mode the density indicator expresses density of wireless communication in terms of a number of wireless terminals participating in wireless communications in the pertinent area.

In an example embodiment and mode the processor circuitry is configured to include the density-dependent resource list in a system information block broadcast by the cellular radio access network.

In an example embodiment and mode the plural pre-defined density values comprise density values of low density, moderate density, high density, and very high density.

In an example embodiment and mode the subset of radio resources comprises one or more pools of radio resources.

In an example embodiment and mode each of plural subsets is also associated with an additional allocation criteria other than density of travel.

In another of its aspects the technology disclosed herein concerns a method in a node of network of a cellular radio access network. In a basic mode the method comprises: using processor circuitry to maintain a density-dependent resource list, the density-dependent resource list comprising plural members corresponding to plural pre-defined density values of wireless communication in an area pertinent to a wireless terminal, each of the plural members respectively comprising an identifier/pointer/mapper/definition of a subset of a set of radio resources for use in vehicle (V2X) communication, each of plural subsets being associated with a corresponding one of plural pre-defined density values; and, transmitting the density-dependent resource list over a radio interface.

In an example embodiment and mode the density indicator expresses density of wireless communication in terms of load on or extent of use of radio resources in the pertinent area.

In an example embodiment and mode the density indicator expresses density of wireless communication in terms of a number of wireless terminals participating in wireless communications in the pertinent area.

In an example embodiment and mode the method further comprises the processor circuitry including the density-dependent resource list in a system information block broadcast by the cellular radio access network.

In an example embodiment and mode the plural predefined density values comprise density values of low density, moderate density, high density, and very high density.

In an example embodiment and mode the subset of radio resources comprises one or more pools of radio resources.

In an example embodiment and mode each of plural subsets is also associated with an additional allocation criteria other than density of travel.

In another of its aspects the technology disclosed herein concerns a method in wireless terminal. In a basic mode the method comprises: selecting radio resources according to a first of plural criteria; selecting radio resources according to a second of plural criteria; and, using, for V2X communication, a radio resource selected according to a combination of the plural criteria.

Although the description above contains many specificities, these should not be construed as limiting the scope of the technology disclosed herein but as merely providing illustrations of some of the presently preferred embodiments of the technology disclosed herein. Thus the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A wireless terminal comprising:
    memory circuitry configured to store information specifying multiple resource pools, wherein each of the multiple resource pools has its own first index;
    determination circuitry configured to determine a second index of a current geographical region; and,
    selection controlling circuitry configured to select a resource pool from the multiple resource pools;
    wherein the selected resource pool is a resource pool having the first index equal to the determined second index.

2. The wireless terminal of claim 1, wherein
    the information is pre-configured in the memory circuitry.

3. The wireless terminal of claim 1, wherein
    the wireless terminal further comprises controlling circuitry configured to receive a system information block (SIB) which carries the information.

4. The wireless terminal of claim 1, wherein the wireless terminal further comprises transmission circuitry configured to transmit a sidelink communication transmission using the selected resource pool.

5. A method in a wireless terminal comprising:
    obtaining information specifying multiple resource pools, wherein each of the multiple resource pools has its own first index;
    determining a second index of a current geographical region; and
    selecting a resource pool from the multiple resource pools, wherein the selected resource pool is a resource pool having the first-index equal to the determined second index.

6. The method of claim 5, wherein
    the information is obtained from memory circuitry in the wireless terminal.

7. The method of claim 5, wherein
    the method further comprises receiving a system information block (SIB) which carries the information.

8. The method of claim 5, wherein the method further comprises transmitting a sidelink communication transmission using the selected resource pool.

* * * * *